(12) United States Patent
Shintani et al.

(10) Patent No.: US 8,160,438 B2
(45) Date of Patent: Apr. 17, 2012

(54) IMAGING DEVICE

(75) Inventors: Dai Shintani, Osaka (JP); Kenichi Honjo, Osaka (JP); Yoshihiro Kanda, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/771,149

(22) Filed: Apr. 30, 2010

(65) Prior Publication Data

US 2010/0284676 A1 Nov. 11, 2010

(30) Foreign Application Priority Data

May 7, 2009 (JP) .................. 2009-112631

(51) Int. Cl.
*G03B 15/03* (2006.01)
(52) U.S. Cl. .................. 396/175; 396/174; 396/177
(58) Field of Classification Search ........... 396/175–178
See application file for complete search history.

(56) References Cited

U.S. PATENT DOCUMENTS

| 6,075,947 A | 6/2000 | Tokunaga |
| 7,012,638 B1 * | 3/2006 | Yokonuma ............. 348/220.1 |
| 7,801,438 B2 * | 9/2010 | Khuntia ................. 396/174 |
| 2002/0064383 A1 | 5/2002 | Kawasaki et al. |
| 2005/0213957 A1 * | 9/2005 | Tokunaga ............. 396/61 |
| 2006/0067668 A1 * | 3/2006 | Kita ................. 396/182 |
| 2006/0221223 A1 * | 10/2006 | Terada ................. 348/333.05 |
| 2008/0074499 A1 * | 3/2008 | Niimura ............. 348/207.1 |

FOREIGN PATENT DOCUMENTS

| JP | 01-304439 A | 12/1989 |
| JP | 03-045939 A | 2/1991 |
| JP | 11-288024 A | 10/1999 |
| JP | 2000-338563 A | 12/2000 |
| JP | 2001-311987 A | 11/2001 |
| JP | 2002-169207 A | 6/2002 |
| JP | 2004-109431 A | 4/2004 |

* cited by examiner

*Primary Examiner* — Clayton E Laballe
*Assistant Examiner* — Dennis Hancock
(74) *Attorney, Agent, or Firm* — Pearne & Gordon LLP

(57) ABSTRACT

An imaging device disclosed herein is a device for acquiring image data about a subject, comprising an image acquisition section, a housing, a flash device, and a flash controller. The image acquisition section is configured to continuously acquire a plurality of image data from an optical image of a subject. The housing holds the image acquisition section. The flash device is configured to emit a flash of light, with which the emission angle of the flash light with respect to the housing can be varied. The flash controller is configured to control the flash device so that the emission angle of the flash light when the plurality of image data are being continuously acquired will differ for at least two image data out of the plurality of image data.

21 Claims, 17 Drawing Sheets

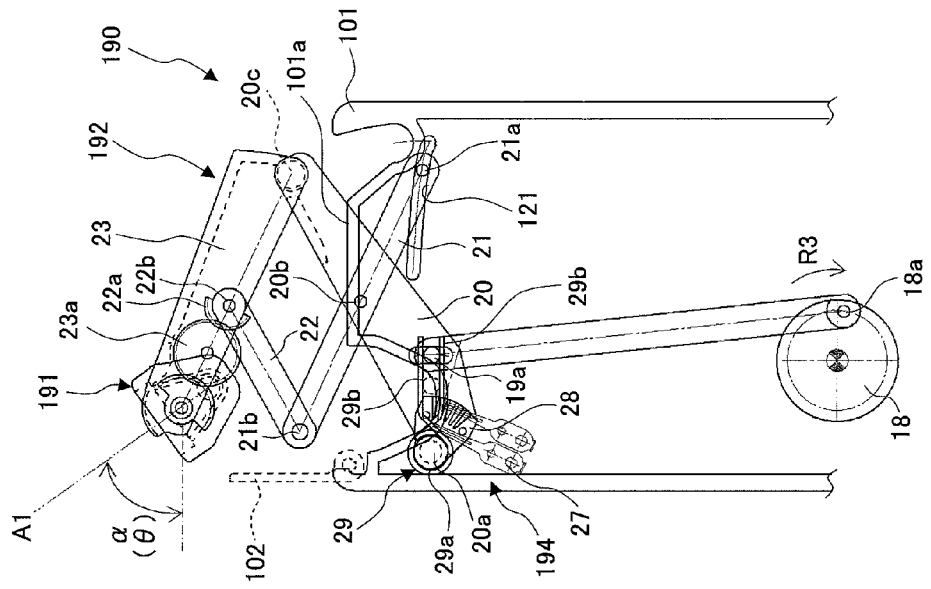
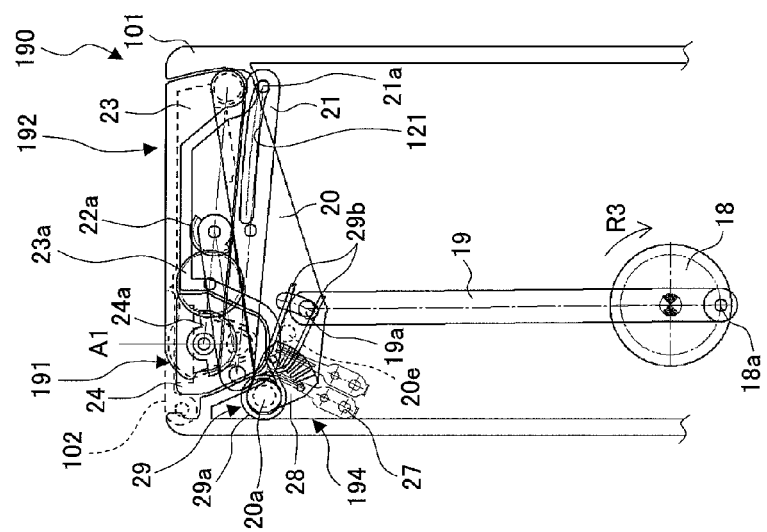

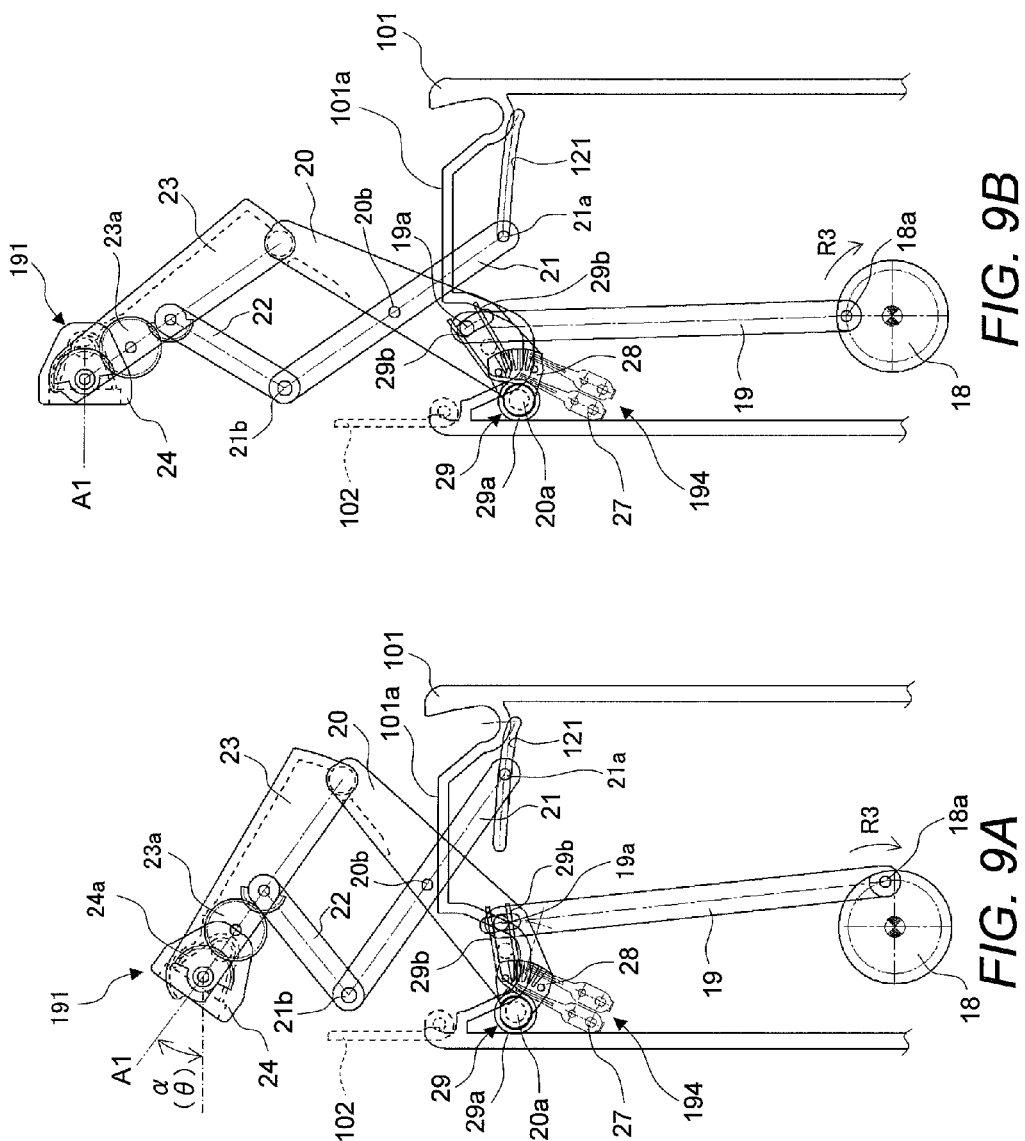

IMAGING DEVICE

CROSS-REFERENCE TO RELATED APPLICATIONS

This application claims priority under 35 U.S.C. §119 to Japanese Patent Application No. 2009-112631 filed on May 7, 2009. The entire disclosure of Japanese Patent Application No. 2009-112631 is hereby incorporated herein by reference.

BACKGROUND

1. Technical Field

The technology disclosed herein relates to an imaging device that acquires image data from an optical image of a subject.

2. Description of the Related Art

In an environment with relatively little light, such as indoors, flash photography is performed using a flash device.

However, when the flash light is shined directly at the subject, there may be dark shadows in the background of the captured image, or there may be glare on the subject.

In view of this, bounce flash photography has been proposed in which the light emitter of the flash device is aimed at the ceiling or a wall. In bounce flash photography, the problems mentioned above are reduced or eliminated since flash light that has reflected off the ceiling, a wall, or some other reflecting object illuminates the subject as indirect light.

However, with bounce flash photography, it is necessary to set a bounce angle by guessing how the reflected light will actually illuminate the subject, but since the positional relation between the reflecting object and the subject varies with the situation, it is difficult to estimate the bounce angle that will be suited to the photography situation at hand.

In view of this, the teaching discussed in Japanese Laid-Open Patent Application H1-304439 has been proposed in order to set the bounce angle. The imaging device discussed in Japanese Laid-Open Patent Application H1-304439 comprises a first measuring means for measuring a subject distance, which is the distance from the imaging device to the subject, and a second measuring means for measuring a reflecting surface distance, which is the distance from the imaging device to the reflecting object. With this imaging device, the bounce angle is determined from the two distances measured by the first and second measuring means.

Also, since there is the possibility that the color temperature of light illuminating a subject will change with the color of the reflecting surface during bounce flash photography, teachings have been proposed in which the white balance is adjusted by means of light pre-emission (see Japanese Laid-Open Patent Application H3-45939, for example).

SUMMARY

Nevertheless, in actual practice the optimal bounce angle will vary with the user's preferences, so with the prior art discussed above, photography is not always performed at the optimal bounce angle for a given user. Also, since the effects of the same bounce flash photography become different from one another in accordance with the environmental of photography, with the prior art discussed above, photography is not always performed at the optimal bounce angle for a given user.

An imaging device disclosed herein is a device for acquiring image data about a subject, comprising an image acquisition section, a housing, a flash device, and a flash controller. The image acquisition section is configured to continuously acquire a plurality of image data from an optical image of a subject. The housing holds the image acquisition section. The flash device is configured to emit a flash of light, with which the emission angle of the flash light with respect to the housing can be varied. The flash controller is configured to control the flash device so that the emission angle of the flash light when the plurality of image data are being continuously acquired differs for at least two image data out of the plurality of image data.

The imaging device here encompasses devices capable of capturing only still pictures, devices capable of capturing only moving pictures, and devices capable of capturing both still pictures and moving pictures. For example, the imaging device may be an interchangeable lens type of digital camera, an integrated digital camera, or a digital video camera. The imaging device may also be just the camera body of an interchangeable lens digital camera.

The emission angle of the flash light with respect to the housing is the angle formed by an imaginary plane using the housing as a reference (such as the top surface) and the optical axis center line of the flash light. In the normal orientation of an imaging device (landscape orientation), this imaginary plane substantially coincides with the horizontal plane, so the emission angle in this case is the angle formed by the horizontal plane and the optical axis center line (that is, the bounce angle). The optical axis center line of the flash light is an imaginary line expressing the concept of substantially all of the flash light being emitted in that direction, and can be deduced from the constitution of the flash device, for example.

BRIEF DESCRIPTION OF THE DRAWINGS

Referring now to the attached drawings, which form a part of this original disclosure:

FIG. 8A is a side view of the flash device 190 in its stowed state, and FIG. 8B is a side view of the flash device 190 in its initial state;

FIG. 9A is a side view of the flash device 190 in its intermediate state, and FIG. 9B is a side view of the flash device 190 in its final state;

DETAILED DESCRIPTION OF EMBODIMENTS

Selected embodiments of the digital camera will now be explained with reference to the drawings. It will be apparent to those skilled in the art from this disclosure that the following descriptions of the embodiments of the digital camera are provided for illustration only and not for the purpose of limiting the invention as defined by the appended claims and their equivalents.

First Embodiment

Summary of Digital Camera

Figure 1:
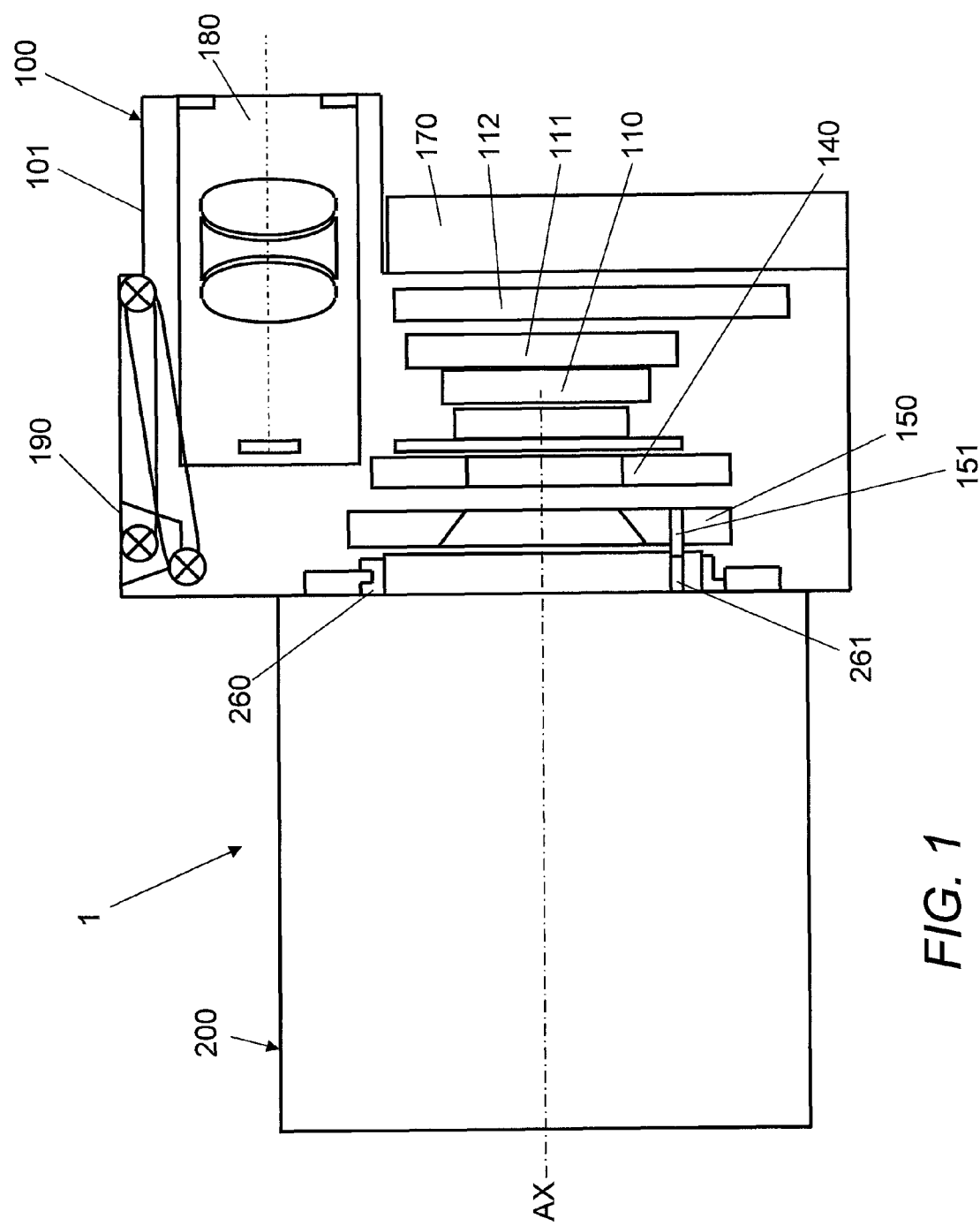
FIG. 1 is an overall diagram of the configuration of a digital camera 1.

As shown in FIG. 1, the digital camera 1 (an example of an imaging device) pertaining to the first embodiment comprises a camera body 100 (an example of an imaging device) and an interchangeable lens unit 200. In this embodiment, the digital camera 1 is an interchangeable lens type of camera, and the interchangeable lens unit 200 is removably mounted to the camera body 100.

Unlike a conventional single lens reflex camera, the camera body 100 has no quick-return mirror, so compared to a conventional single lens reflex camera, the flange back distance of the camera body 100 can be shorter and the overall size of the camera body 100 can be smaller. Furthermore, because of the short flange back distance, the lens-back of the interchangeable lens unit 200 can be shortened, and the interchangeable lens unit 200 can also be made smaller in size. In other words, this digital camera 1 affords a device that is more compact overall.

Furthermore, with this digital camera 1, a flash device 190 can be used to take a series of photographs while varying the bounce angle. The flash device 190 will be described in detail below.

For the sake of convenience in the following description, the subject side of the camera body 100 will be referred to as "front," the image plane side as "rear," the vertical upper side in the normal orientation (landscape orientation) of the camera body 100 as "upper," and the vertical lower side as "lower," but these terms are not intended to limit the usage state of the digital camera 1.

Interchangeable Lens Unit

The interchangeable lens unit 200 comprises an optical system (not shown) for forming an optical image of a subject, a lens controller (not shown), and a lens mount ring 260 having an electrical contact 261. The line AX indicates the optical axis center line of the optical system. The lens controller holds lens data related to the specifications of the interchangeable lens unit 200 and so forth, and can send lens data to a body controller 113 (discussed below) of the camera body 100 via the electrical contact 261. The lens controller and the body controller 113 perform focus lens drive control, aperture drive control, blur correction control, and the like.

Camera Body

Figure 2:
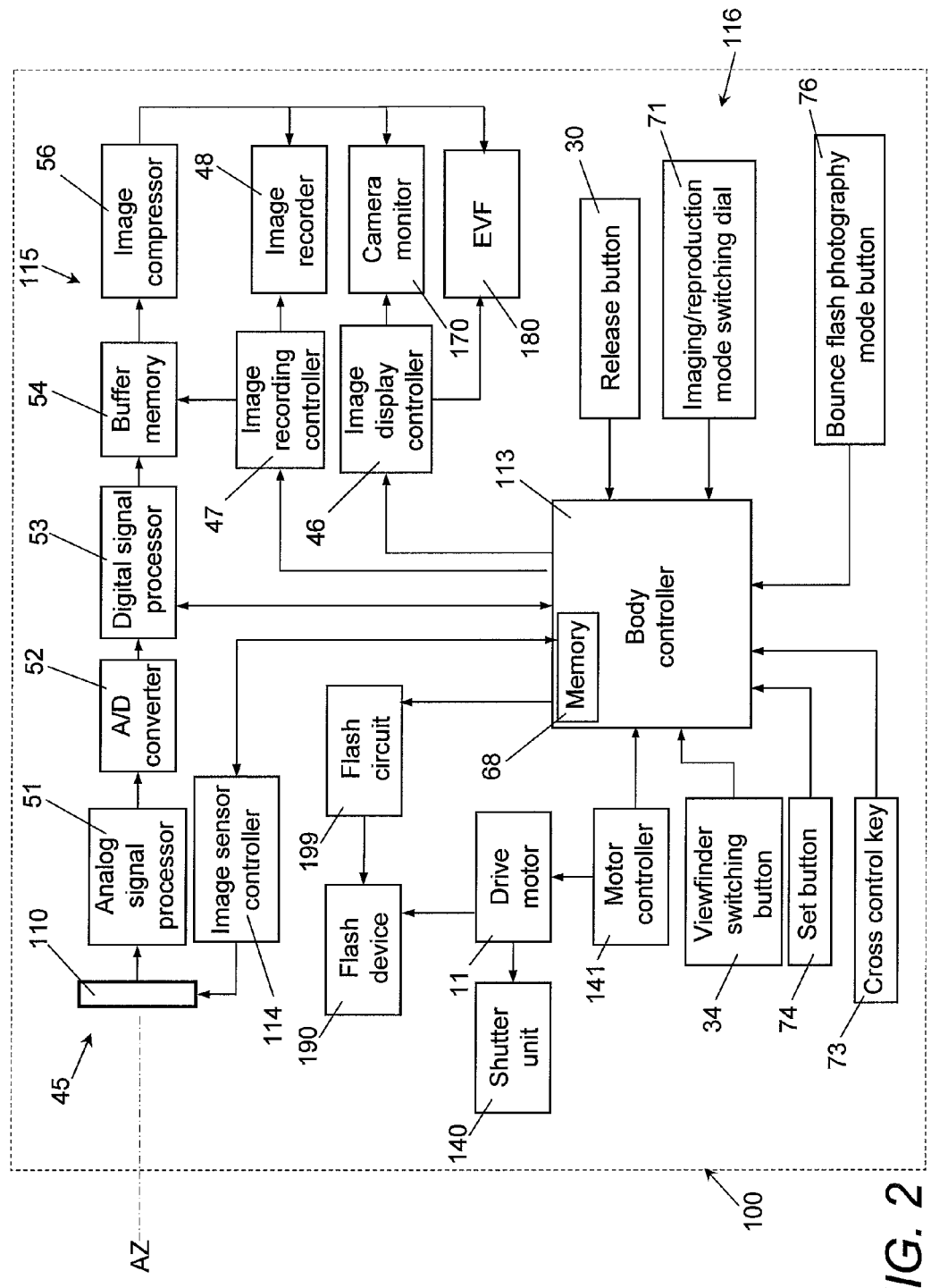
FIG. 2 is a diagram of the configuration of a camera body 100.

As shown in FIGS. 1 and 2, the camera body 100 mainly comprises an image acquisition section 45, the body controller 113, a shutter unit 140, a body mount 150, a camera monitor 170 (an example of a display unit), and an EVF (electrical viewfinder) 180.

The image acquisition section 45 converts an optical image of a subject into an electrical signal. More specifically, as shown in FIG. 2, the image acquisition section 45 mainly comprises an image sensor 110, an image sensor controller 114 that controls the operation of the image sensor 110, an image processor 115, and a control unit 116 (an example of a control interface). These components are provided to the main circuit board 112 or the image sensor circuit board 111 shown in FIG. 1, for example.

The image sensor 110 is an element that converts an optical image of a subject into an image signal, and is a CMOS (Complementary Metal Oxide Semiconductor) or a CCD (Charge Coupled Device), for example. The image sensor controller 114 can read at high speed the charges stored in the image sensor 110. For instance, the image sensor controller 114 corresponds not only to an ordinary read-out method, but also to thinning read-out and addition read-out methods, and is capable of high-speed output of image signals with less information than image signals read out by an ordinary method.

Image signals outputted from the image sensor 110 are subjected to various processing by the image processor 115. More specifically, as shown in FIG. 2, an image signal outputted from the image sensor 110 is processed by an analog signal processor 51, an A/D converter 52, a digital signal processor 53, a buffer memory 54, and an image compressor 56, in that order.

The analog signal processor 51 subjects the image signal outputted from the imaging sensor 110 to gamma processing or other such analog signal processing. The A/D converter 52 converts the analog image signal outputted from the analog signal processor 51 into a digital signal. The digital signal processor 53 subjects the image signal converted into a digital signal by the A/D converter 52 to digital signal processing such as noise elimination or contour enhancement. The image signal that has undergone digital signal processing is sent from the digital signal processor 53 to the buffer memory 54. The buffer memory 54 temporarily stores the image signal processed by the digital signal processor 53. The buffer memory 54 is a RAM (Random Access Memory) or other such recording medium, for example.

The buffer memory 54 sends the stored image signals to the image compressor 56 at a command from an image recording controller 47. The image compressor 56 performs image compression on image signals that it receives. This compression reduces the image signal to a smaller data size than that of the original image signal. The compression method can be, for example, JPEG (Joint Photographic Experts Group). The image data produced by compression of the image signal is sent from the image compressor 56 to an image recorder 48 and the camera monitor 170.

The image recording controller 47 and the image recorder 48 are provided in order to record image data. The image recording controller 47 controls the image recorder 48 on the basis of a control signal sent from the body controller 113. More specifically, the image recording controller 47 causes the image recorder 48 to read and write image data from and to a card-type recording medium (not shown), for example. The image recorder 48 records image data to the recording medium on the basis of a command from the image recording controller 47. The image recorder 48 can record the image data to the recording medium while associating the data with various kinds of information. Information that can be recorded along with the image data includes, for example, the date and time the image was captured, focal distance information, shutter speed information, the aperture value, and the bounce angle (discussed below).

The camera monitor 170 and the EVF 180 are liquid crystal monitors, for example, and display image data as visible images. The camera monitor 170 and the EVF 180 allow moving and still pictures to be selectively displayed. Other examples of the camera monitor 170 and the EVF 180 besides a liquid crystal monitor include organic EL devices, inorganic EL devices, plasma display panels, and other such devices that can display images.

The shutter unit 140 is what is known as a focal plane shutter, and has a front screen (not shown) and a rear screen (not shown). The amount of exposure of the image sensor 110 is adjusted by a slit formed between the front and rear screens. The elastic force of a spring (not shown), for example, is utilized to drive the front and rear screens, and this spring force is charged by a drive motor 11 (discussed below).

Also, when an image sensor 110 having an electronic front screen function is used, the amount of exposure of the image sensor 110 is adjusted by means of a slit formed between the electronic front screen and the mechanical rear screen. As mentioned above, the elastic force of a spring (not shown), for example, is utilized to drive the rear screen, and this spring force is charged by the drive motor 11 (discussed below).

The body controller 113 is a central processing command device that handles all control of the camera body 100, and sends control commands to the lens controller and the various control components of the camera body 100. The body controller 113 is installed on the main circuit board 112 (FIG. 1), for example, and has a memory 68 for storing various kinds of information and signals.

The body mount 150 has an electrical contact 151. The lens mount ring 260 of the interchangeable lens unit 200 is mounted to the body mount 150. In a state in which the lens mount ring 260 has been mounted to the body mount 150, the electrical contact 151 of the body mount 150 is in electrical contact with the electrical contact 261 of the lens mount ring 260. The body controller 113 and the lens controller can communicate with each other via the electrical contact 151 and the electrical contact 261.

The control unit 116 has a release button 30, a viewfinder switching button 34, an imaging/reproduction mode switching dial 71, a bounce flash photography mode button 76, a cross control key 73, and a set button 74.

The release button 30 is a two-stage switch that can be pressed halfway down or all the way down to send the shutter operation timing to the body controller 113, and when the user presses the release button 30 halfway down, light metering, range finding, auto-focusing, and other such photography preliminary processing is commenced. When the button is pressed all the way down, photography processing is commenced.

The viewfinder switching button 34 is used to select either the camera monitor 170 or the EVF 180 as the viewfinder for observing the subject. The imaging mode referred to here is a mode for newly acquiring image data of a subject. The reproduction mode is a mode for displaying recorded image data as a visible image.

Figure 12:
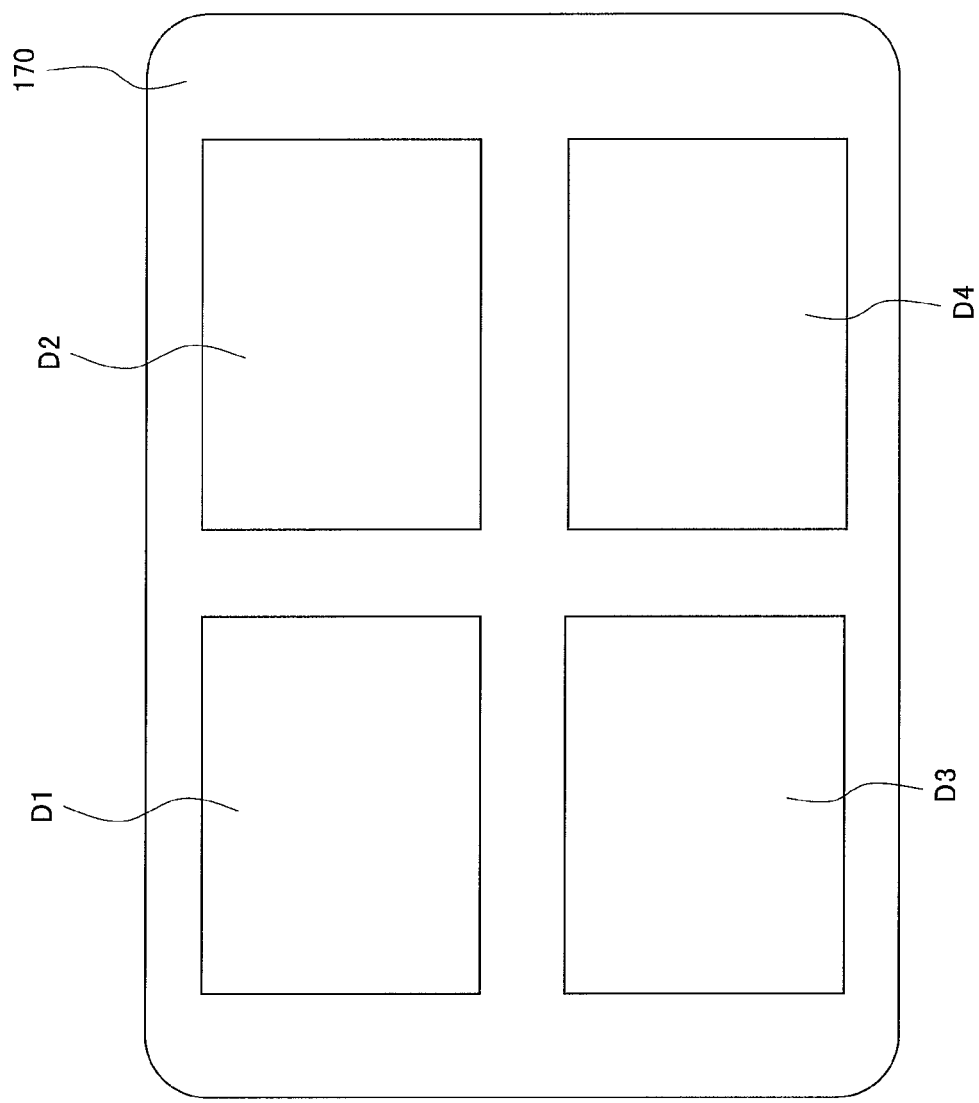
FIG. 12 is a display example of a camera monitor 170.

The cross control key 73 is used to select the categories to be displayed on the camera monitor 170, etc. The set button 74 is used to execute selection and other processing. For instance, as shown in FIG. 12, the cross control key 73 and the set button 74 are used to select one of the four images D1 to D4 displayed on the camera monitor 170, as selected image data.

The body controller 113 is electrically connected with the control unit 116, and is able to receive signals outputted from the various control members.

Overview of Flash Device

Figure 3:
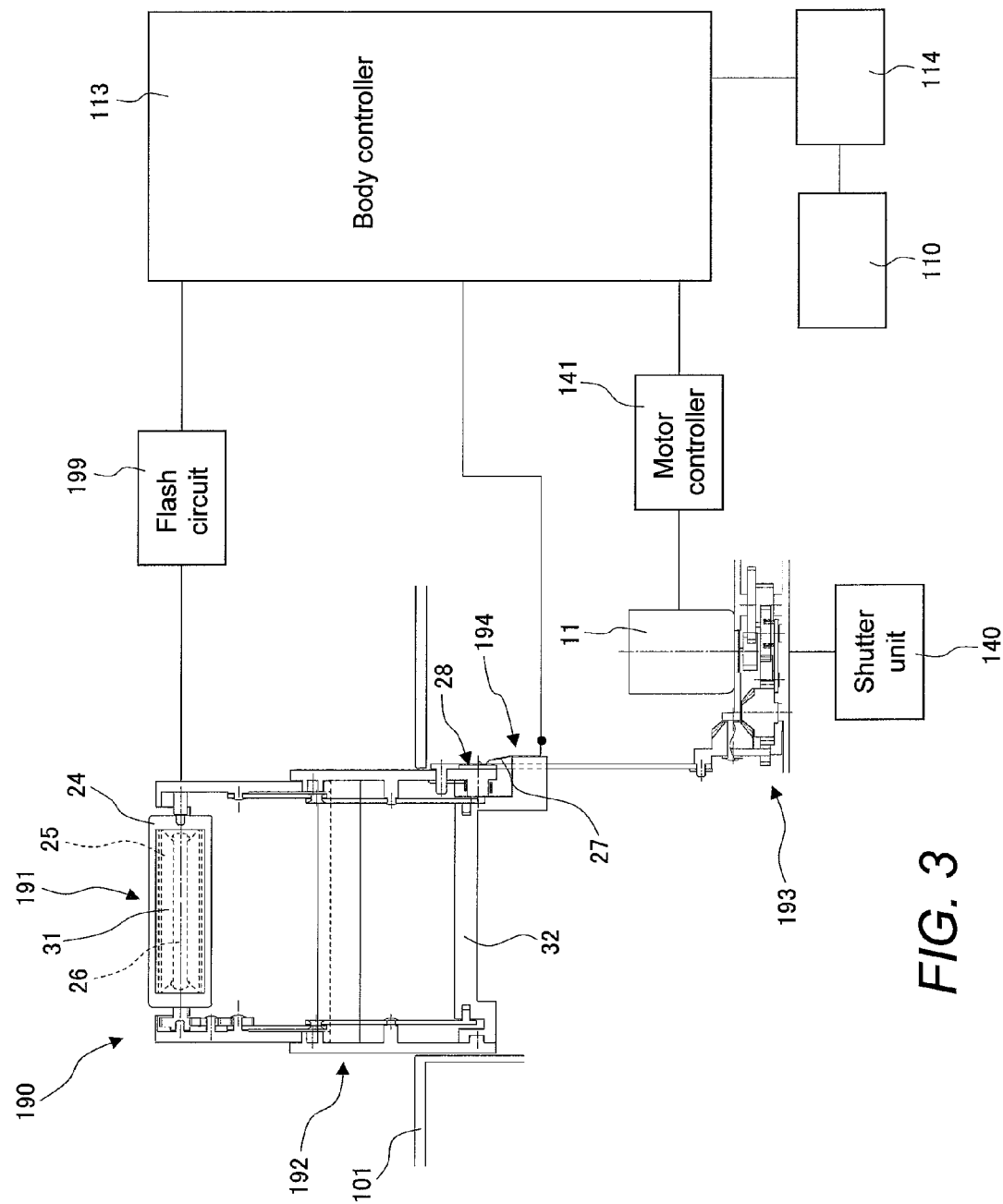
FIG. 3 is a simplified diagram of the configuration of a flash device 190 and its surroundings.

As shown in FIGS. 1 and 2, the camera body 100 further comprises a flash device 190 used during flash photography. The flash device 190 is provided so that it can pop up during flash photography, and is collapsed and stowed in the camera body 100 when not being used. As shown in FIG. 3, the flash device 190 is connected to a flash circuit 199 including a capacitor (not shown), a booster circuit (not shown), and a light emission trigger circuit (not shown). The flash circuit 199 causes a xenon tube 26 (discussed below) of the flash device 190 to emit light, and can flash the xenon tube 26 in synchronization with an imaging commencement signal of the image sensor controller 114. The flash circuit 199, the body controller 113, and a motor controller 141 constitute a flash controller that controls the flash device 190.

Figure 4:
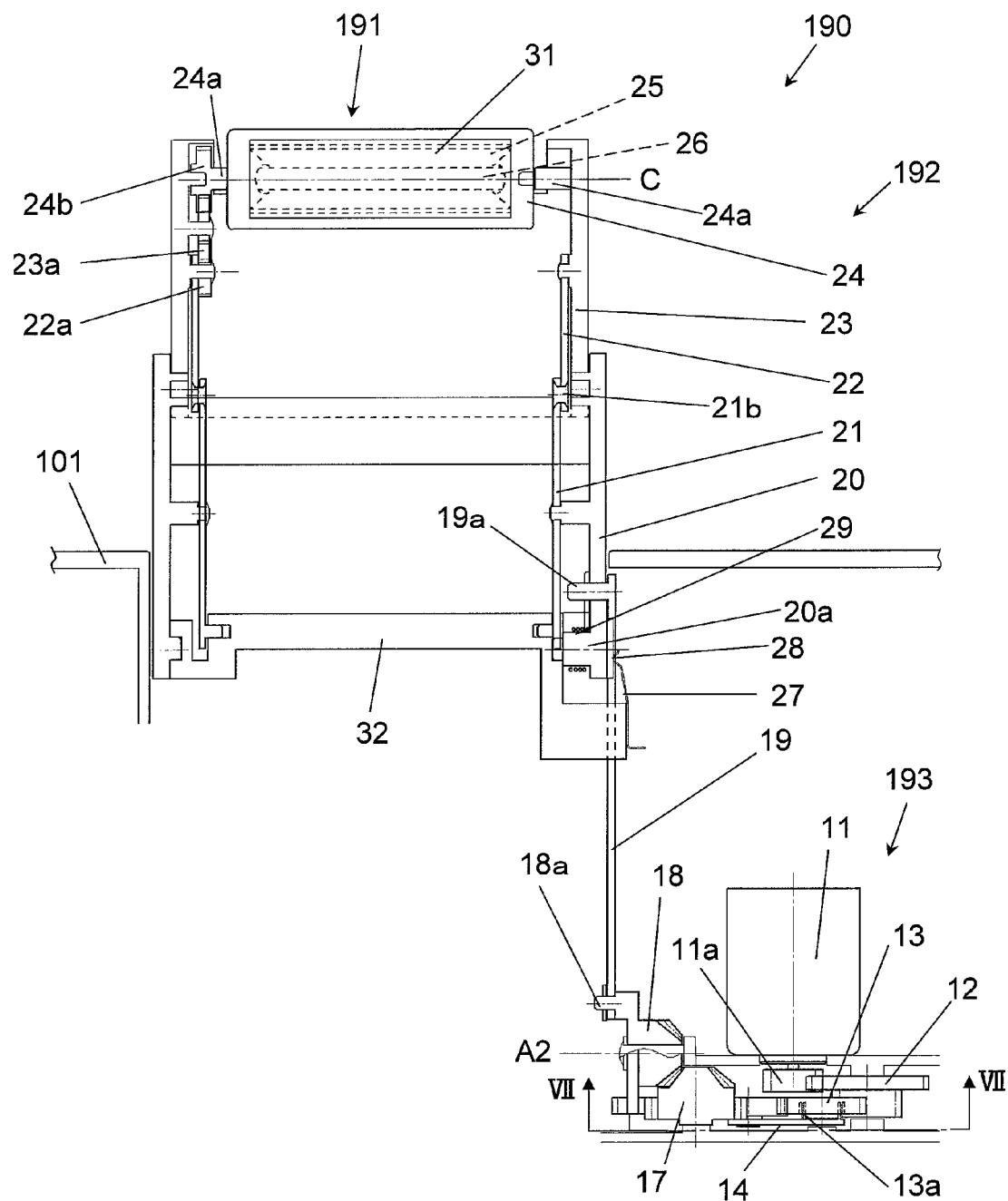
FIG. 4 is a front view of the flash device 190 (final state)
Figure 5:
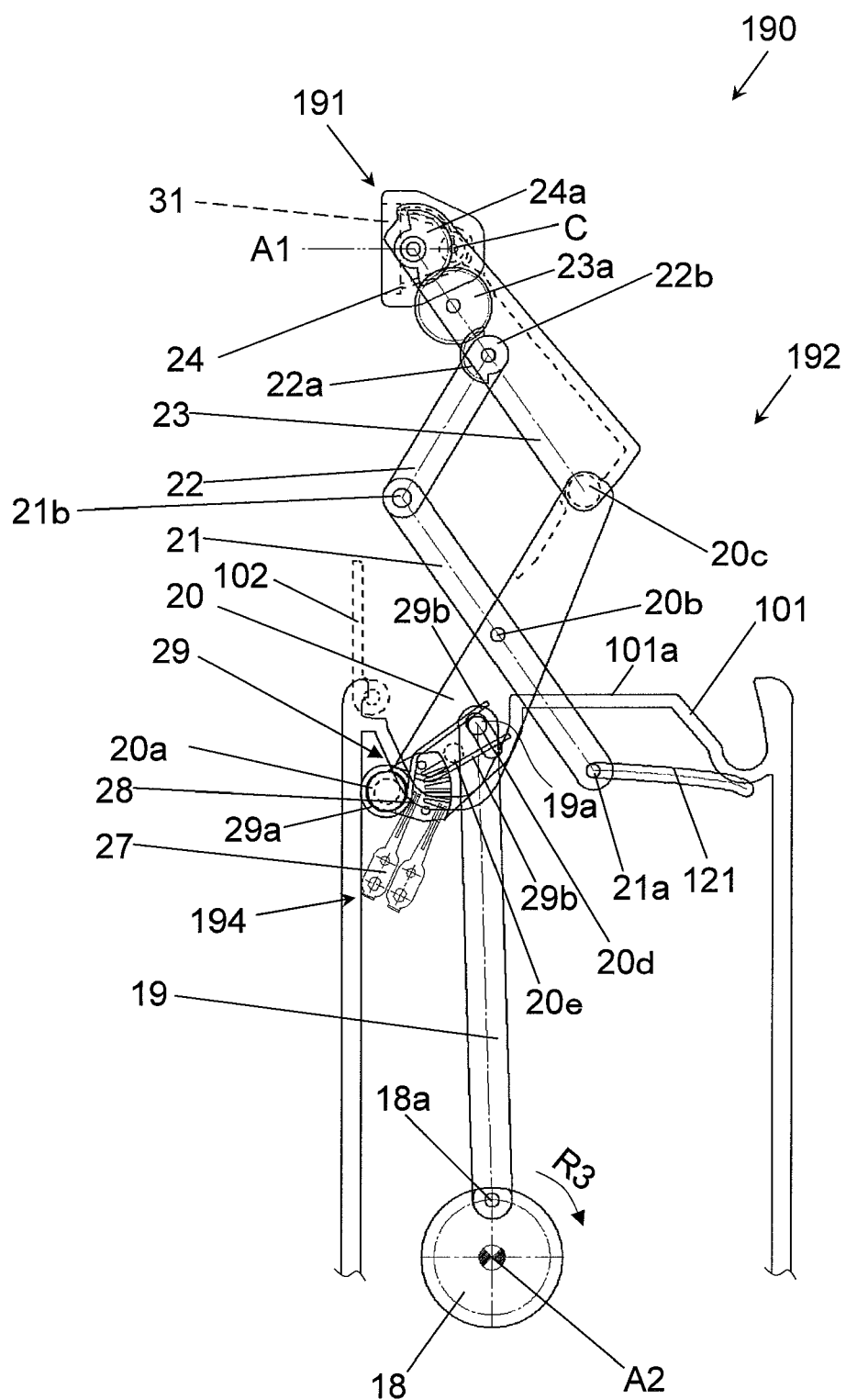
FIG. 5 is a side view of the flash device 190 (final state)

As shown in FIGS. 3 to 5, the flash device 190 has a light emitter 191 that emits flash light, a drive unit 193 (an example of a drive unit), a linking mechanism 192 (an example of an angle changing unit) that supports the light emitter 191 with respect to a housing 101, and an angle sensor 194 (an example of an angle detector).

Light Emitter

As shown in FIGS. 4 and 5, the light emitter 191 has the xenon tube 26 (serving as a light emitting body), a reflector 25 (serving as a reflecting plate), a reflector support frame 24, and a Fresnel lens 31. The reflector support frame 24 is rotatably supported by a rotary shaft 24a at one end of a second drive lever 23, and supports the reflector 25, the Fresnel lens 31, and the xenon tube 26. The xenon tube 26 is electrically connected to the flash circuit 199. As discussed above, the light emission operation of the xenon tube 26 is controlled by the flash circuit 199. The flash light emitted from the xenon tube 26 is reflected by the reflector 25, and this reflected light is emitted from the light emitter 191 substantially along the optical axis A1 and diffused by the Fresnel lens 31 over a range that can cover the field angle of the interchangeable lens unit 200 (see FIG. 5).

Figure 6:
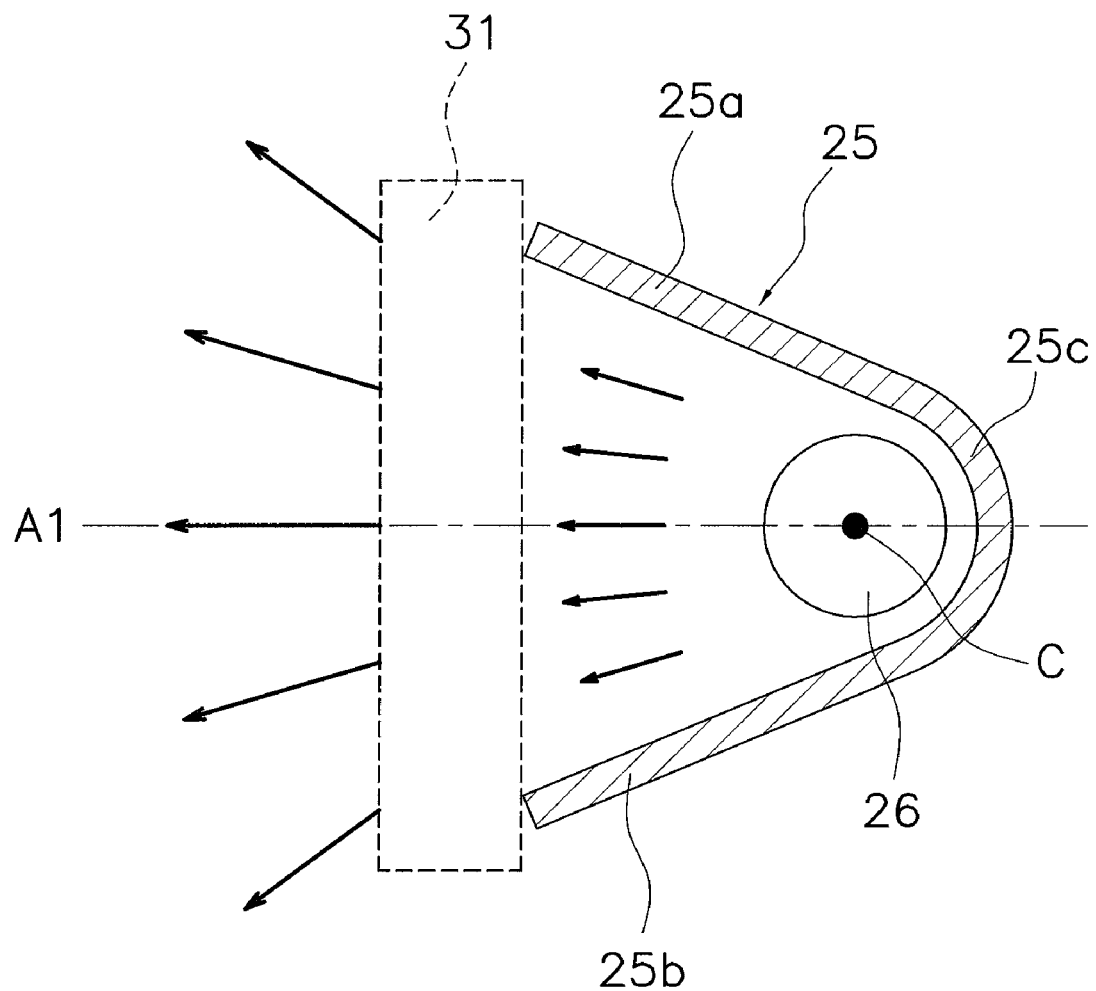
FIG. 6 illustrates the optical axis A1 of the flash device 190.

As shown in FIG. 6, the optical axis A1 here is an imaginary line that is perpendicular to the center line C of the xenon tube 26 and is substantially parallel to the overall direction in which the light reflected by the reflector 25 is emitted, out of all the light emitted by the xenon tube 26. More precisely, as shown in FIG. 6, the reflector 25 has a curved portion 25c that curves around the xenon tube 26, and a pair of flat portions 25a extending from the curved portion 25c. The flat portions 25a are disposed in line symmetry with respect to an imaginary line perpendicular to the center line C, and are disposed so as to be inclined with respect to this imaginary line. This imaginary line is the optical axis A1, and light emitted from the xenon tube 26 is reflected by the flat portions 25a and emitted from the light emitter 191 substantially along the optical axis A1. The light emitted from the light emitter 191 is diffused up and down around the optical axis A1 by the Fresnel lens 31. That is, the optical axis A1 is the typical center line had by a flash device, and can be determined from the position of the xenon tube 26 or other such light emitting body and the shape of the reflector 25 or other such reflecting body.

Drive Unit

Figure 7:
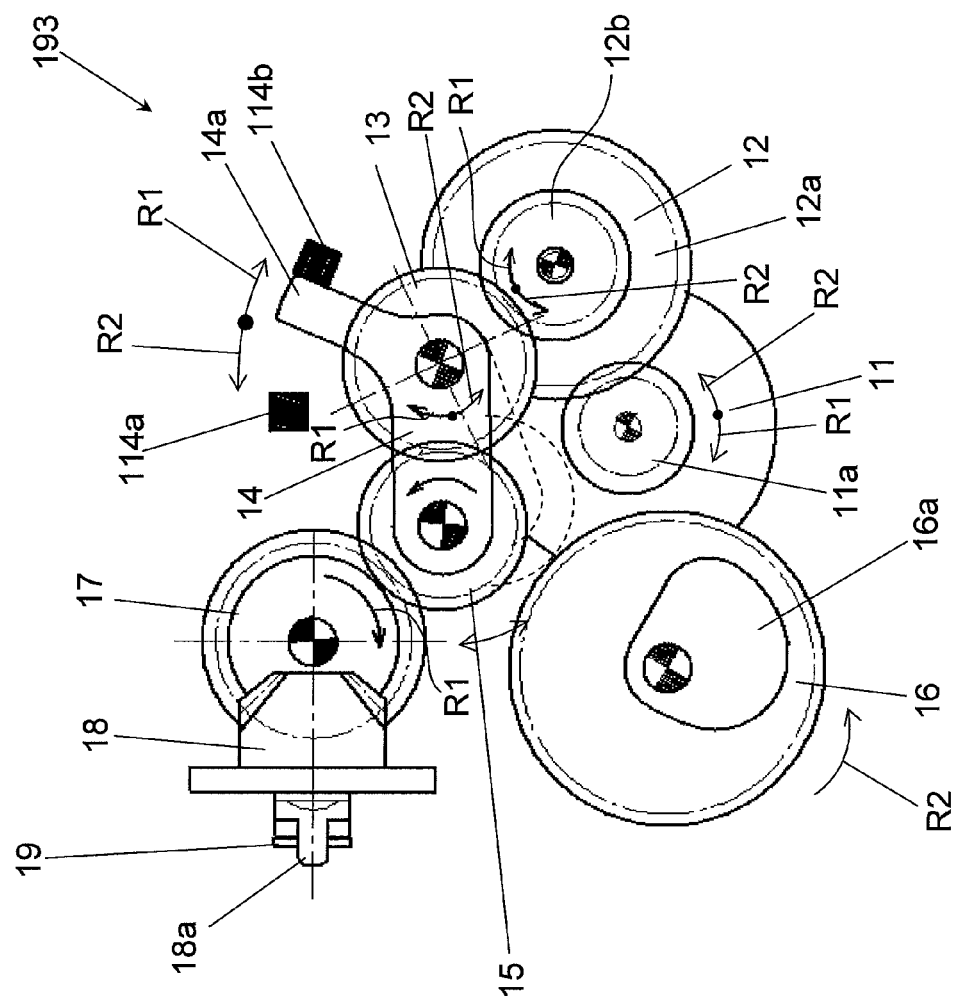
FIG. 7 is a diagram of the configuration of a drive unit 193 (along the VII-VII line in FIG. 4)

The drive unit 193 generates drive force for changing the state of the flash device 190. More specifically, as shown in FIG. 7, the drive unit 193 has the drive motor 11, a gear 12, a sun gear 13, a carrier 14, a planetary gear 15, a cam gear 16, and a gear 17.

The drive motor 11 is the drive source for the flash device 190, and is a stepping motor, for example. The drive motor 11 is supported by the housing 101, and is also used in the charging of the shutter unit 140 with drive force. As shown in FIGS. 2 and 3, the drive motor 11 is connected to the motor controller 141, and the motor controller 141 is connected to the body controller 113. The motor controller 141 produces drive pulses on the basis of control signals sent from the body controller 113. The control signals sent from the body controller 113 include information indicating the drive direction and drive amount (rotational angle), and the motor controller 141 sends drive pulses to the drive motor 11 according to these control signals. A drive gear 11a for rotationally driving the gear 12 is fixed to the end of the shaft of the drive motor 11.

The gear 12 has a first gear 12a and a second gear 12b that is smaller in diameter than the first gear 12a. The first gear 12a meshes with the drive gear 11a. The second gear 12b meshes with the sun gear 13, so drive force is transmitted from the drive gear 11a to the sun gear 13 through the gear 12.

The sun gear 13 is rotatably supported by the housing 101. The carrier 14 is rotatably mounted to the sun gear 13. The carrier 14 supports the planetary gear 15 so as to allow motion around the outer periphery of the sun gear 13. The planetary gear 15 is always meshes with the sun gear 13, and is disposed so as to be capable of meshing with either the gear 17 or the cam gear 16.

The carrier 14 has a lever 14a, and the lever 14a is able to move between a first stopper 114a and a second stopper 114b. The lever 14a is able to hit the first stopper 114a and the second stopper 114b. In a state in which the lever 14a is in contact with the first stopper 114a, the planetary gear 15 meshes with the cam gear 16. In a state in which the lever 14a is in contact with the second stopper 114b, the planetary gear 15 meshes with the gear 17.

Also, as shown in FIG. 4, a biasing spring 13a is mounted to the sun gear 13. The biasing spring 13a is provided slidably with the carrier 14, and the carrier 14 is rotated in the same direction as the sun gear 13 by the frictional force generated between the carrier 14 and the biasing spring 13a when the sun gear 13 rotates. Accordingly, the planetary gear 15 moves around the outer periphery of the sun gear 13 in the same direction as the rotation direction of the sun gear 13.

As shown in FIG. 7, the cam gear 16 has a cam 16a that performs shutter charging. The gear 17 has a bevel gear portion and a spur gear portion, with the bevel gear portion and spur gear portion being formed integrally. The spur gear meshes with the planetary gear 15, and the bevel gear portion meshes with a bevel gear 18. The bevel gear 18 is linked to the end of an coupling lever 19 via a drive pin 18a provided to the bevel gear 18, so that the drive force of the drive motor 11 is transmitted from the bevel gear 18 to the coupling lever 19.

As shown in FIG. 7, when the drive gear 11a is rotationally driven in the R2 direction by the drive motor 11, the gear 12 rotates in the R1 direction, and the sun gear 13 rotates in the R2 direction. At this point, the frictional force generated between the carrier 14 and the biasing spring 13a shown in FIG. 4 causes the carrier 14 to follow the planetary gear 15 and rotate in the R2 direction until hitting the first stopper 114a. The biasing spring 13a may be arranged between the planetary gear 15 and the carrier 14. When the carrier 14 hits the first stopper 114a, the cam gear 16 and the planetary gear 15 mesh, and the cam gear 16 begins to rotate in the R2 direction. As a result, drive force that moves the front and rear screens is charged by the drive motor 11 via the cam gear 16. Thus, the charge operation to drive the shutter unit 140 can be performed. Since the drive source of the shutter unit 140 is thus utilized as the drive source for the flash device 190, there is no need for a drive source to be provided separately for the flash device 190.

Then, when the drive gear 11a is rotationally driven in the R1 direction by the drive motor 11, the gear 12 rotates in the R2 direction, and the sun gear 13 rotates in the R1 direction. When the sun gear 13 rotates in the R1 direction, the frictional force generated between the biasing spring 13a and the carrier 14 moves the carrier 14 in the same direction as the rotational direction of the sun gear 13 (in this case, the R1 direction). Therefore, the planetary gear 15 moves around the sun gear 13 in the same direction as the rotational direction of the sun gear 13. When the lever 14a hits the second stopper 114b, the planetary gear 15 meshes with the gear 17, and the gear 17 begins to rotate in the R1 direction. Further, the gear 17 meshes with the bevel gear 18, and the bevel gear 18 begins to rotate. As a result, the coupling lever 19 moves in the up and down direction, and the linking mechanism 192 (discussed below) is driven.

The rotation directions of the cam gear 16 and the bevel gear 18 are set at one direction, with the cam gear 16 rotating only in the R2 direction in the state shown in FIG. 7, and the bevel gear 18 rotating only in the R3 direction in the state shown in FIG. 5.

Linking Mechanism

The linking mechanism 192 is used to alter the position and orientation of the light emitter 191 with respect to the housing 101, and can change the state of the flash device 190 from its pop-up state to its stowed state. The linking mechanism 192 is driven by the drive unit 193. More specifically, as shown in FIGS. 4 and 5, the linking mechanism 192 has the coupling lever 19, a pair of first drive levers 20, a pair of second drive levers 23, a pair of first linking levers 21, and a pair of second linking levers 22. The first drive levers 20 and the second drive levers 23 movably support the light emitter 191 with respect to the housing 101, and the positions of the first drive levers 20 and the second drive levers 23 are determined by the first linking levers 21 and the second linking levers 22.

The end of the coupling lever 19 is rotatably supported by the drive pin 18a of the bevel gear 18. A pin 19a is provided to the other end of the coupling lever 19, and the pin 19a is inserted into guide slots 20d of the first drive levers 20.

The first drive levers 20 are rotatably supported with respect to the housing 101. More specifically, the first drive levers 20 are rotatably supported by a support member 32 that is fixed to the housing 101. A rotary shaft 20a is provided to the ends of the first drive levers 20, and the rotary shaft 20a is inserted into holes provided to the support member 32. The coiled part 29a of a support spring 29 is fitted over the rotary shaft 20a, and a pair of arms 29b of the support spring 29 sandwich and support fixing pins 20e of the first drive levers 20 and the pin 19a passing through the guide slot 20d. The fixing pins 20e have substantially the same outside diameter as the pin 19a, and there is a tiny gap between the fixing pins 20e and the arms 29b of the support spring 29, and a tiny gap between the pin 19a and the arms 29b.

The first drive levers 20 further have rotary shafts 20b and 20c. The rotary shaft 20c is inserted into holes in the second drive levers 23, and the first drive levers 20 rotatably support the second drive levers 23. The rotary shaft 20b of the first drive levers 20 rotatably supports the first linking levers 21. The rotary shaft 20b is arranged substantially at the center of the first drive lever 20. The rotary shaft 20b is fitted into holes in the approximate center of the first linking levers 21.

A cam follower 21a is provided to the end of the first linking levers 21 on the housing 101 side. The cam follower 21a is inserted into a cam groove 121 formed in the housing 101. A rotary shaft 21b that rotatably supports the second linking levers 22 is provided to the other end of the first linking levers 21. The rotary shaft 21b is inserted into holes provided to the ends of the second linking levers 22.

A rotary shaft 22b is provided to the other end of the second linking levers 22. The rotary shaft 22b is rotatably supported with the second drive lever 23. A gear 22a is fixed to the second linking levers 22 so as to be coaxial with the rotary shaft 22b.

A gear 23a meshing the gear 22a is rotatably provided to the second drive lever 23. The gear 23a meshes with a gear 24b which is integrally formed with the reflector support frame 24.

With the above constitution, when the drive gear 11a is driven in the R1 direction by the drive motor 11 in FIG. 7, the bevel gear 18 rotates in the R3 direction in FIG. 5. As a result, the first drive levers 20 rotate around the rotary shaft 20a via the coupling lever 19 and the support spring 29. When the coupling lever 19 rotates, the second drive lever 23 rotates around the rotary shaft 20c via the first linking levers 21 and the second linking levers 22. As a result, the light emitter 191 moves up and down.

Furthermore, since the relative motion of the second linking levers 22 and the second drive lever 23 is converted by the gear 22a into the rotary motion of the reflector support frame 24, as the light emitter 191 moves up and down, the orientation of the light emitter 191 with respect to the housing 101 can be changed, and the emission angle α of flash light with respect to the housing 101 (the direction of the optical axis A1 with respect to the housing 101) can be continuously varied. The emission angle α refers to the angle formed by the optical axis A1 and the upper face 101a of the housing 101 (see, for example, FIGS. 8B and 9A discussed below). The upper face 101a is disposed parallel to the optical axis AX of the interchangeable lens unit 200. When the housing 101 is in its landscape orientation, the bounce angle θ using the horizontal plane as a reference can be continuously varied by the flash device 190.

The bounce angle θ here refers to the angle θ formed by the optical axis A1 and the horizontal plane during imaging (see FIGS. 8B and 9A). In the normal imaging orientation (landscape orientation), the horizontal plane is substantially parallel to the upper face 101a of the housing 101, so the angle formed by the upper face 101a and the optical axis A1 substantially coincides with the bounce angle θ. In the following description, it will be assumed that landscape orientation is used, which is the normal imaging orientation.

The state of the flash device 190 can be altered to the state shown in FIGS. 8A to 9B by driving the linking mechanism 192 with the drive motor 11. The state shown in FIG. 8A is a stowed state, and the state shown in FIG. 8B is the home position that serves as a reference in bounce flash photography mode. The state shown in FIG. 9A is one in which the flash device 190 has popped up from the state shown in FIG. 8B, and the state shown in FIG. 9B is one in which the flash device 190 has popped up all the way. The state shown in FIG. 9B corresponds to the final state in bounce flash photography mode.

In the stowed state shown in FIG. 8A, the drive pin 18a of the bevel gear 18 is located at the lowermost end, and the coupling lever 19 is also descended all the way. Here, since the pin 19a pulls the arms 29b of the support spring 29 downward, the elastic force generated by the coiled part 29a causes the upper arm 29b to push the fixing pins 20e of the first drive levers 20 downward. Since the first drive levers 20 is in contact with the housing 101 at this point, the first drive levers 20 are pushed against the housing 101 by the elastic force of the support spring 29. Consequently, the flash device 190 is not prone to rattling in a state in which the flash device 190 has been stowed.

Also, in the stowed state shown in FIG. 8A, a protector plate 102 covers the light emitter 191 of the flash device 190, and protects the Fresnel lens and so forth of the reflector support frame 24. The protector plate 102 is supported by a snap action spring (not shown) with respect to the housing 101 at two positions: the closed position shown in FIG. 7 and the open position shown in FIG. 8. The drive force of the drive motor 11, for example, is used to open and close the protector plate 102.

When the flash device 190 commences bounce drive from the stowed state shown in FIG. 8A, a drive pulse is produced by the motor controller 141 and sent to the drive motor 11. The drive gear 11a is rotationally driven in the R1 direction by the drive motor 11 by a rotational angle corresponding to the drive pulse of the motor controller 141, and the linking mechanism 192 is driven according to the rotational angle of the drive gear 11a.

For example, FIGS. 8B and 9A show a state in which further rotational drive has been performed by the drive motor 11 from the state shown in FIG. 8A, and as the light emitter 191 rises, the optical axis A1 of the light emitter 191 gradually approaches horizontal. That is, the farther the light emitter 191 moves away from the housing 101, the closer the optical axis A1 moves to horizontal, and the emission angle α of the flash light with respect to the housing 101 steadily becomes smaller. When the coupling lever 19 reaches the uppermost end, the flash device 190 finally enters the state shown in FIG. 9B. In this state, the optical axis A1 is substantially parallel to the optical axis AX, so the flash light directly illuminates the subject. That is, in the state shown in FIG. 9B the bounce angle θ is zero.

Angle Sensor

The flash device 190 further has an angle sensor 194 (an example of an angle detector) in order to detect the orientation of the flash device 190. The angle sensor 194 has an encoder board 28 and an electrical contact 27. The encoder board 28 is fixed to the rotary shaft 20a of the first drive levers 20, and the electrical contact 27 is fixed to the support member 32 in a state of being in electrical contact with the encoder board 28. When the first drive levers 20 rotates with respect to the support member 32, the electrical contact 27 slides over the encoder board 28. The electrical contact 27 is electrically connected to the body controller 113.

For example, the electrical contact 27 in this embodiment is designed to output a 1-bit pattern, and in the stowed state (the state shown in FIG. 8A) and the popped up state (the state shown in FIG. 9B) of the flash device 190, a relatively long L signal is outputted from the electrical contact 27, while discretely short L signals are outputted in between the stowed state and the popped up state. The state of the flash device 190 can be ascertained by counting the L signals outputted from the electrical contact 27. That is, the bounce angle θ using the horizontal plane as a reference can be detected by the angle sensor 194 and the body controller 113.

How the bounce angle θ is detected is not limited to the above method, and any other method may be used so long as the state of the flash device 190 can be detected.

Figure 10:
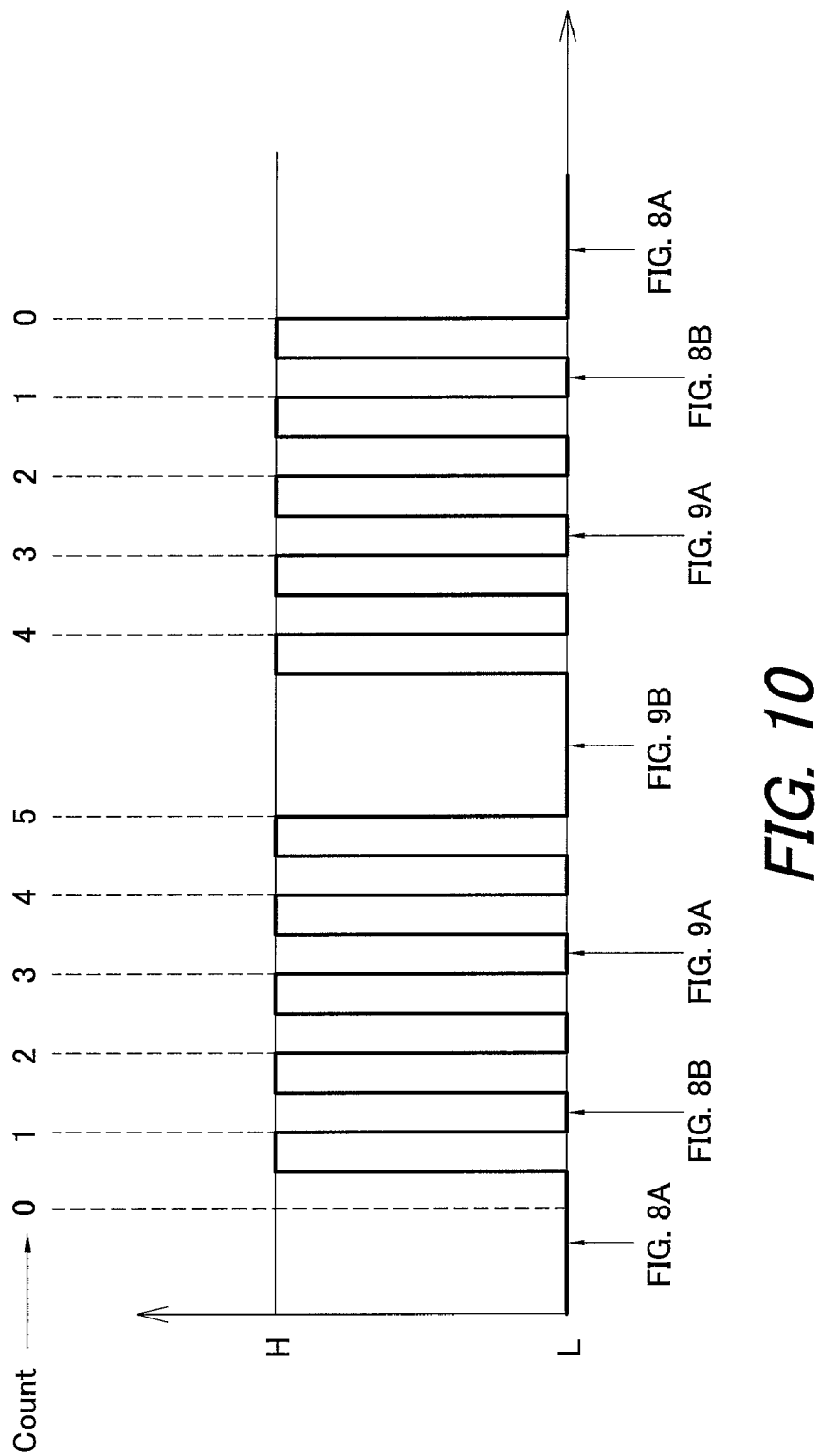
FIG. 10 is a graph of the output signal of an angle sensor 194.

The state of the flash device 190 is monitored by the body controller 113. More specifically, in the popped up state shown in FIG. 9B and the stowed state shown in FIG. 8A, L signals are outputted from the electrical contact 27. In this embodiment, as shown in FIG. 10, short L signals are outputted four times in between the popped up state and the stowed state. The body controller 113 counts how many times L signals are outputted from the electrical contact 27. The body controller 113 can recognize the state of the flash device 190 by counting how many times an L signal is outputted.

For example, when the flash device 190 is driven by the drive motor 11 from the stowed state shown in FIG. 8A, an L signal is outputted five times from the angle sensor 194 until the popped up state shown in FIG. 9B is reached. The body controller 113 adds up the number of times an L signal is outputted here.

When the flash device 190 is driven by the drive motor 11 from the state shown in FIG. 9B, an L signal is outputted five times from the angle sensor 194 until the stowed state shown in FIG. 8A is reached. The body controller 113 subtracts the number of times an L signal is outputted here. Thereafter, the body controller 113 repeats the addition and subtraction of L signal outputs using counts of "0" and "5" as a reference. Doing this allows the body controller 113 to recognize the state of the flash device 190.

Operation of Digital Camera

The digital camera 1 has a bounce flash photography mode as one of its photography modes. In bounce flash photography mode, a series of images are captured while the bounce angle θ of the flash device 190 is varied. The operation of the bounce flash photography mode will now be described.

Figure 11:
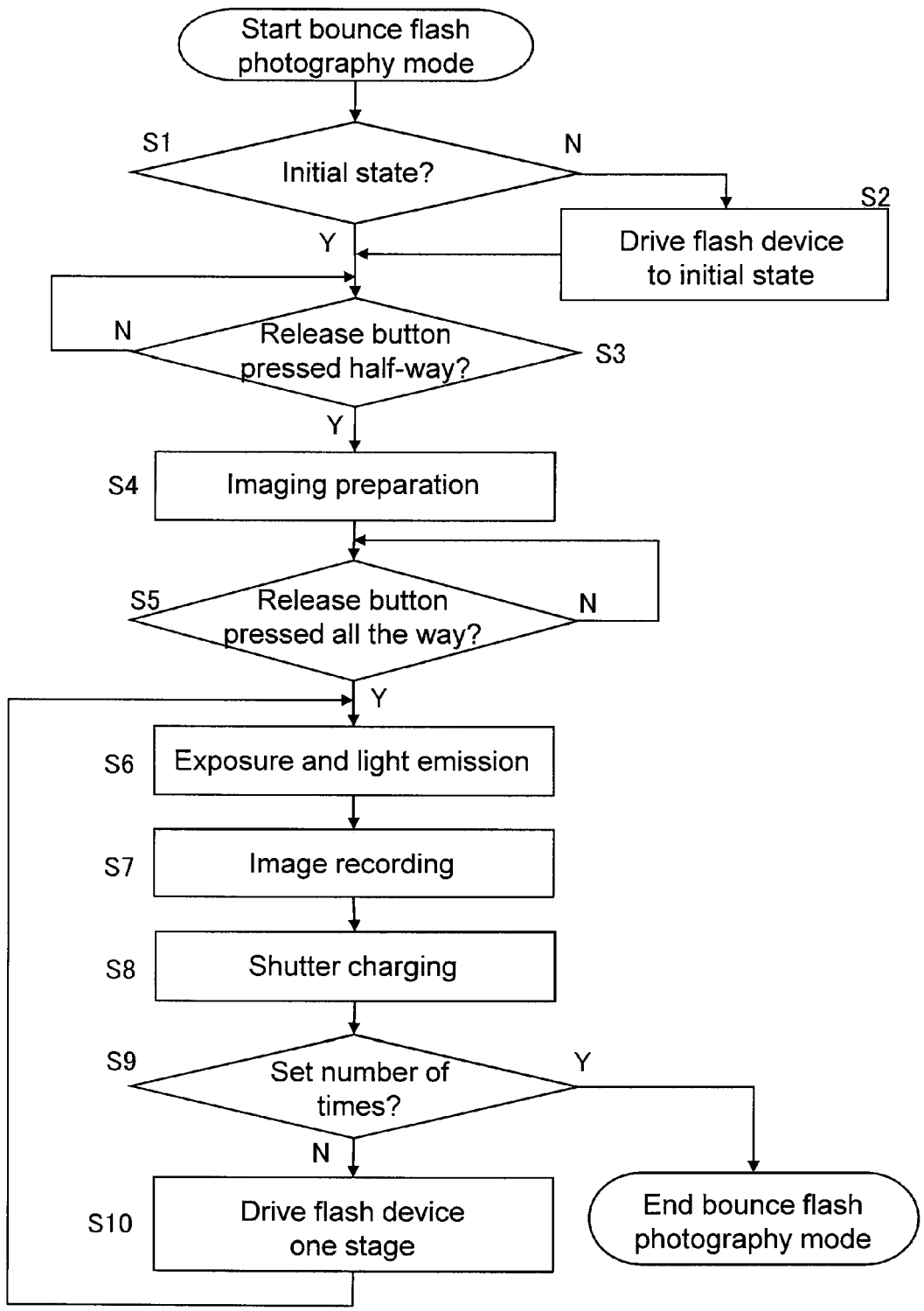
FIG. 11 is a flowchart of bounce flash photography mode.

When the bounce flash photography mode button 76 shown in FIG. 2 is pressed, the photography mode changes to bounce flash photography mode. As shown in FIG. 11, in bounce flash photography mode, the body controller 113 checks whether or not the state of the flash device 190 is the initial state (S1). More specifically, since the body controller 113 counts the L signals outputted from the electrical contact 27 as discussed above, the body controller 113 ascertains the state of the flash device 190 at the point when the mode changes to bounce flash photography. In this embodiment, the initial state is the state shown in FIG. 8A.

If the flash device 190 is in its initial state, the processing moves to step S3. If the flash device 190 is not in its initial state, the flash device 190 is driven until the flash device 190 reaches the initial state shown in FIG. 8B (S2). More specifically, a drive pulse is sent from the motor controller 141 to the drive motor 11 until the flash device 190 reaches its initial state. As a result, the linking mechanism 192 is driven by the drive motor 11, and the state of the flash device 190 changes. The body controller 113 at this time counts the L signals outputs from the angle sensor 194, and detects the state of the flash device 190. At the point when the flash device 190 has reached its initial state, the body controller 113 sends a stop command to the motor controller 141, and the drive motor 11 stops. Thus, the state of the flash device 190 is initialized, and the processing moves to step S3.

Next, the state of the release button 30 is monitored by the body controller 113 (S3). If the release button 30 has been pressed half-way down, auto-focusing or other such imaging preparation is performed (S4). If the release button 30 is pressed all the way down, sequential imaging is performed the set number of times (S5). The shutter unit 140 operates at the shutter speed that has been set (or found by computation), and exposure of the image sensor 110 is performed (S6).

Simultaneously with exposure, flash light is emitted from the flash device 190 (S6). More specifically, a light emission signal synchronized with the charge accumulation start signal of the image sensor controller 114 is sent from the body controller 113 to the flash circuit 199. The flash circuit 199 causes the xenon tube 26 of the flash device 190 to emit light on the basis of this light emission signal. Since the flash device 190 at this point is in the state shown in FIG. 8B, flash light is emitted upward at an angle from the light emitter 191. Indoors, this flash light is reflected off the ceiling, and the reflected light illuminates the subject as indirect light.

After exposure and light emission, the charge stored in the image sensor 110 is read by the image sensor controller 114 and outputted as an image signal. After image processing by the image processor 115, the outputted image data is recorded to the image recorder 48 (S7). Data indicating the state of the flash device 190 (that is, the bounce angle θ) is recorded along with the image data and associated with the image data. This "data indicating the state of the flash device 190" is the number of times the L signals have been outputted as counted by the body controller 113.

After the recording of the image data, shutter charging is performed (S8). More specifically, a shutter charge control signal is sent from the body controller 113 to the motor controller 141. The motor controller 141 produces a drive pulse for the drive motor 11 on the basis of this control signal, and the drive gear 11a is driven by the drive motor 11 in the R2 direction by a rotational angle corresponding to this drive pulse. The amount by which the drive gear 11a is driven here is calculated from the rotational angle of the cam gear 16 required for charging, and is preset by the body controller 113. Consequently, the spring used by the shutter unit 140 is charged via the cam gear 16.

Upon completion of shutter charging, the body controller 113 confirms whether or not the number of exposures has reached the set number (S9). This set number indicates the number of sequential images to be captured, and is preset to the body controller 113. In this embodiment, the set number is four times. If the number of exposures has not reached the set number, the flash device 190 is driven by one step.

The one step referred to here means that the flash device 190 is driven by an angle corresponding to a change from one L signal to the next L signal.

This one-step drive is carried out while the L signals outputted from the angle sensor 194 are monitored by the body controller 113. More specifically, after the rotational drive of the drive motor 11 has started, drive by the drive motor 11 is continued until another L signal is outputted from the angle sensor 194.

After this drive of one step, the exposure, light emission, and shutter charging are repeated until the flash device 190 reaches its final state (the state shown in FIG. 9B) S6 to S8). When the image sensor 110 has the electric shutter function, or when the image sensor 110 is capable of performing thin-out read mode or pixel addition read mode, which are used in the moving picture photography, the step S8 may be skipped. This allows the processing speed of the entire sequence to be higher. Four sets of image data acquired continuously are sequentially recorded to the image recorder 48. Information indicating the state of the flash device 190 (that is, the bounce angle θ) is recorded along with the various image data here.

If the user uses the imaging/reproduction mode switching dial 71 to select reproduction mode, the user looks through the images recorded to the image recorder 48. The above-mentioned four sets of image data can be displayed as visible images and arranged next to each other on the camera monitor 170, as shown in FIG. 12, for example. The user can compare the four images D1 to D4 to find the image captured at the bounce angle θ best suited to the imaging environment.

Features of Digital Camera (1) Thus, with this digital camera 1, when a plurality of sets of image data are continuously acquired in bounce flash photography mode, imaging can be performed so that the emission angle α (in the case of landscape orientation, the bounce angle θ using the horizontal plane as a reference) of flash light with respect to the housing 101 will be different for each set of image data. Consequently, in flash photography, a plurality of sets of image data representing various ways of illuminating the subject can be acquired, and imaging can be performed at a bounce angle that is appropriate for the imaging environment.

Also, since sequential imaging with the image acquisition section 45 is performed in conjunction with the changing of the emission angle α of the flash light with respect to the housing 101 (in the case of landscape orientation, a change in the bounce angle θ using the horizontal plane as a reference), it is possible to change the bounce angle θ and sequential imaging more smoothly.

(2) Since the plurality of sets of image data acquired sequentially are recorded in association with data indicating the state of the flash device 190 when the image data were acquired, the state of the flash device 190 during imaging (in the case of landscape orientation, the bounce angle θ using the horizontal plane as a reference) can be found from the image data.

(3) Since the body controller 113 controls the flash device 190 on the basis of the detection result of the angle sensor 194, the state of the flash device 190 when image data are acquired (in the case of landscape orientation, the bounce angle θ using the horizontal plane as a reference) can be accurately ascertained.

(4) As shown in FIG. 12, since a plurality of sets of image data can be displayed side by side as visible images on the camera monitor 170, it is easier to compare a plurality of sets of image data acquired sequentially, and it is easier to find the image data acquired at the bounce angle θ that is best suited to the imaging environment from among the plurality of sets of image data.

(5) Sine the shutter unit 140 and the linking mechanism 192 share the drive motor 11 as their drive source, there is no need to provide a separate drive source for the flash device 190, which keeps the imaging device from becoming larger.

(6) The linking mechanism 192 can alter the position and orientation of the light emitter 191 with respect to the housing 101 so that the farther the light emitter 191 is away from the housing 101, the smaller is the emission angle α. Consequently, when the illumination is forward, with which shading by the interchangeable lens unit 200 is apt to occur, the light emitter 191 can be disposed away from the housing 101, which suppresses shading by the interchangeable lens unit 200.

Second Embodiment

With the digital camera 1 discussed above, a plurality of sequentially acquired sets of image data are recorded to the image recorder 48, but the constitution may instead be such that preliminary sequential imaging is performed while varying the emission angle α, and main imaging is then performed at the bounce angle θ corresponding to the image data selected from among the plurality of sets of image data thus acquired. In the following description, those components having substantially the same function as in the first embodiment will be numbered the same and not described again in detail.

Figure 13:
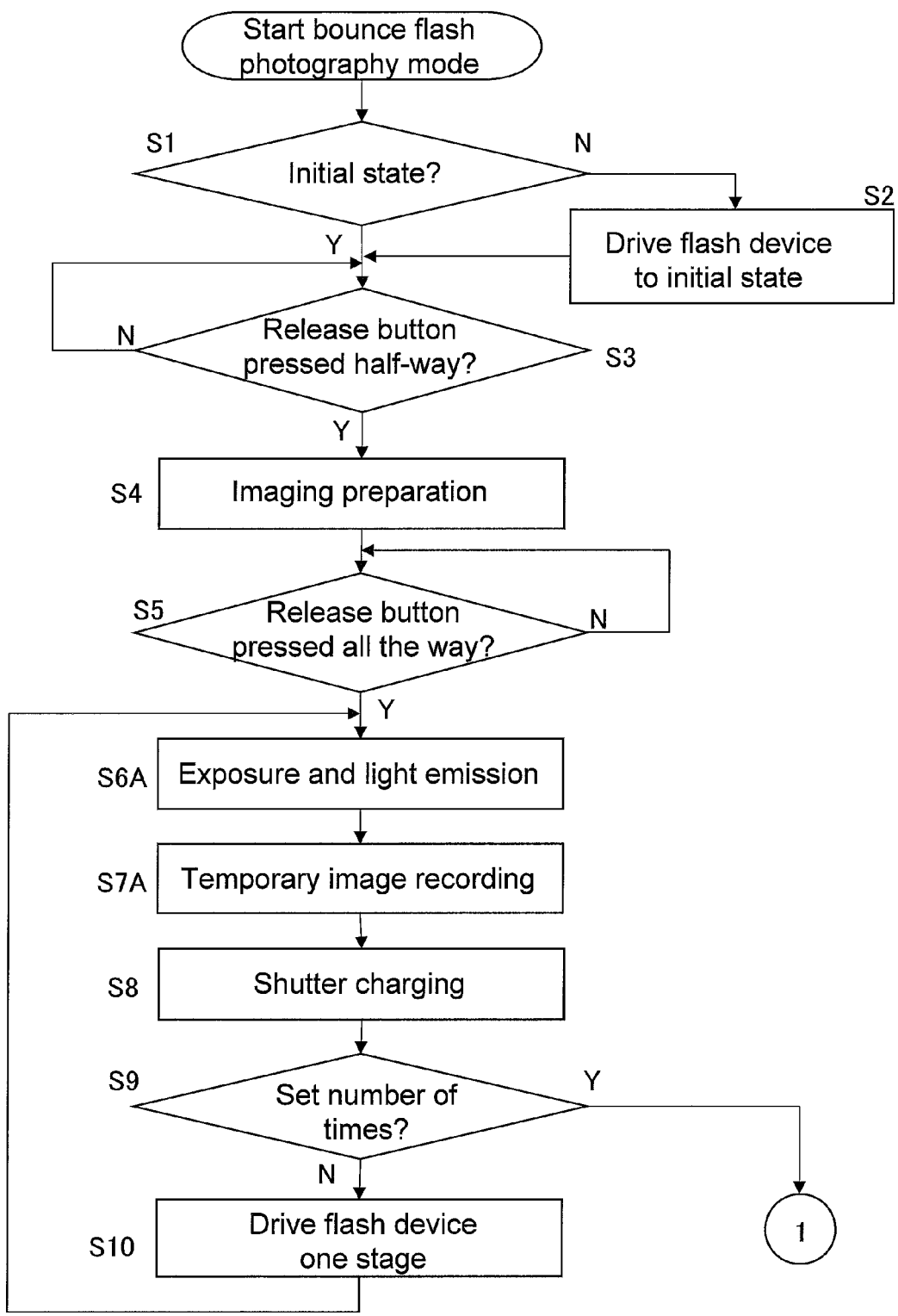
FIG. 13 is a flowchart of bounce flash photography mode (second embodiment)

In this case, the mechanical constitution of the digital camera 1 is the same as that in the first embodiment above, but the control method differs from that in the first embodiment above. More specifically, as shown in FIG. 13, exposure and light emission are performed in step 6A, but in the reading of the charge from the image sensor 110 by the image sensor controller 114, thinning read-out is performed, for example. This thinning read-out is a method for thinning out the charge at specific coordinates in reading out the stored charge. This thinning read-out allows the amount of information about the image signal outputted from the image sensor 110 to be made smaller, and allows the volume of image data to be reduced. When a plurality of sets of image data are continuously acquired by the image acquisition section 45, the volume of image data is smaller than the volume of image data when not acquired continuously.

Also, in step 7A, the image data acquired by the image acquisition section 45 is temporarily recorded to the memory of the camera monitor 170. At this point, the bounce angle θ during imaging is also temporarily recorded to the memory along with the image data and in association with the image data. When sequential imaging has been performed the set number of times, as shown in FIG. 12, four sets of sequentially obtained image data are displayed as visible images D1 to D4 on the camera monitor 170 (S9A).

Figure 14:
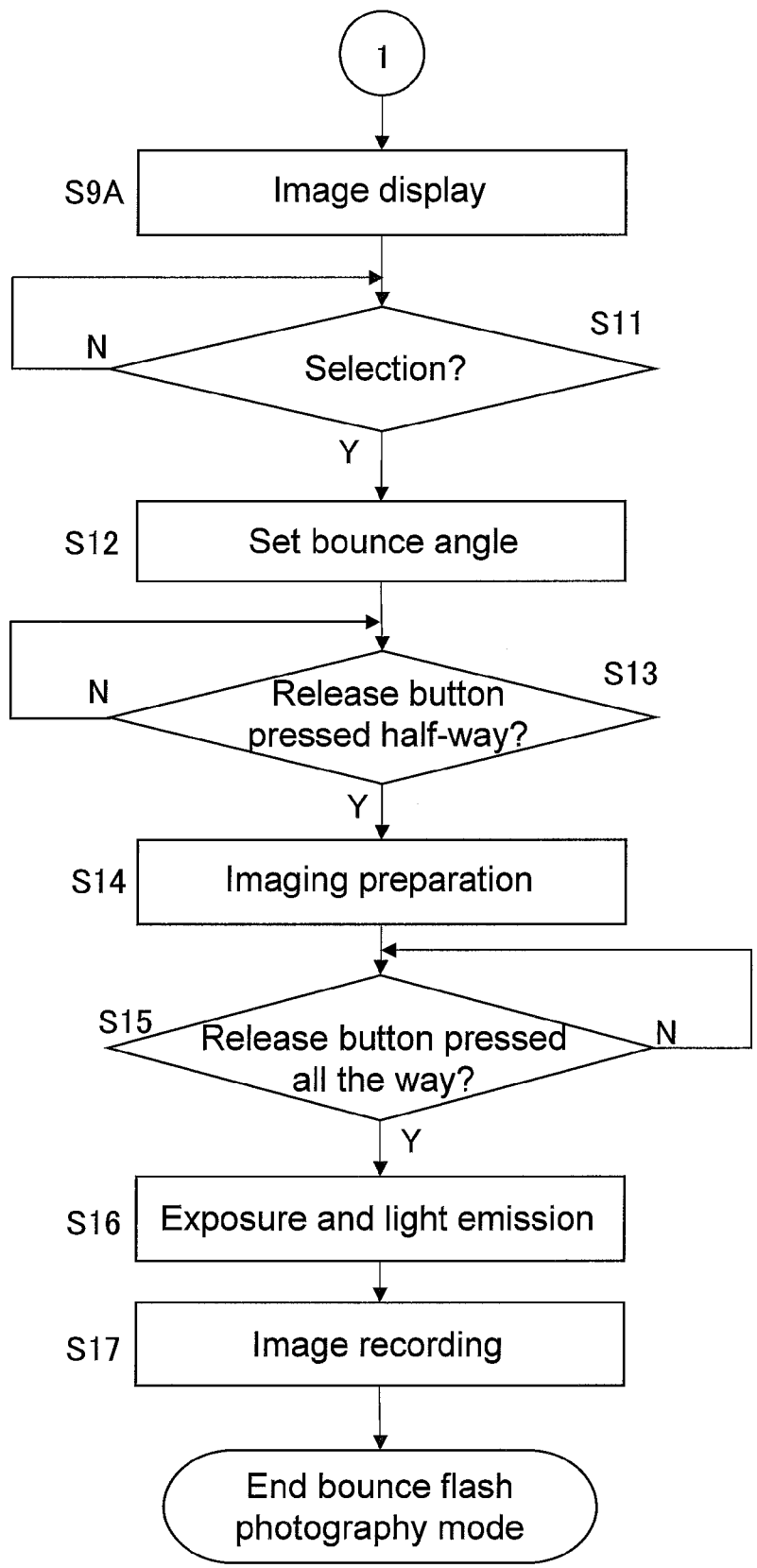
FIG. 14 is a flowchart of bounce flash photography mode (second embodiment)

Furthermore, as shown in FIG. 14, the user uses the cross control key 73 and the set button 74 (FIG. 2) to select one set of image data from among the four sets (S11). When a set of image data is selected, the bounce angle θ corresponding to the selected image data is acquired as the selected bounce angle θs by the body controller 113, and the bounce angle of the flash device 190 is set to this selected bounce angle θs. More specifically, a control signal indicating the drive direction and drive amount is sent from the body controller 113 to the motor controller 141, and the motor controller 141 sends a drive pulse to the drive motor 11 on the basis of this control signal. Consequently, the bounce angle of the flash device 190 can be quickly set to the optimal bounce angle θs.

Main imaging is performed after the bounce angle has been set. More specifically, the state of the release button 30 is monitored by the body controller 113 (S13). If the release button 30 has been pressed halfway down, auto-focusing and other such imaging preparations are carried out (S14). When the release button 30 is pressed all the way down, sequential imaging is performed the set number of times (S15). More specifically, the shutter unit 140 operates at the shutter speed that has been set (or found by computation), and exposure of the image sensor 110 is performed (S16).

Simultaneously with exposure, flash light is emitted from the flash device 190 (S17). More specifically, a signal synchronized with the operation of the shutter unit 140 is sent from the flash device 190 to the flash circuit 199. The flash circuit 199 causes the xenon tube 26 of the flash device 190 to emit light on the basis of this signal.

Upon completion of the exposure, the image data is recorded by the image recorder 48 to a recording medium, and main imaging in bounce flash photography mode is complete (S17).

Thus, with this digital camera 1, the bounce angle θ of the flash device 190 can be quickly set to the optimal bounce angle θs, and main imaging can be easily performed at the optimal bounce angle θs according to the imaging situation.

Third Embodiment

In the first and second embodiments above, the bounce angle was varied in stages by the drive motor 11, but the way the bounce angle is varied is not limited to this. A constitution in which imaging is performed by varying the bounce angle can also be realized with a flash device 290 as discussed below. In the following description, those components having substantially the same function as in the first and second embodiments will be numbered the same and not described again in detail.

Figure 15A:
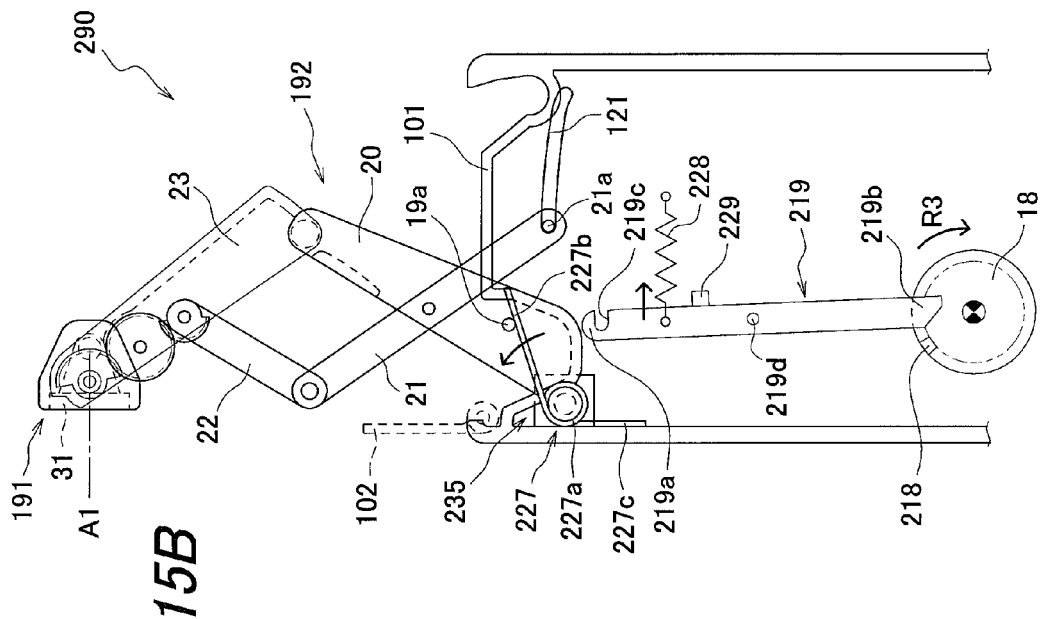
FIG. 15A is a side view of a flash device 290 in its stowed state.
Figure 15B:
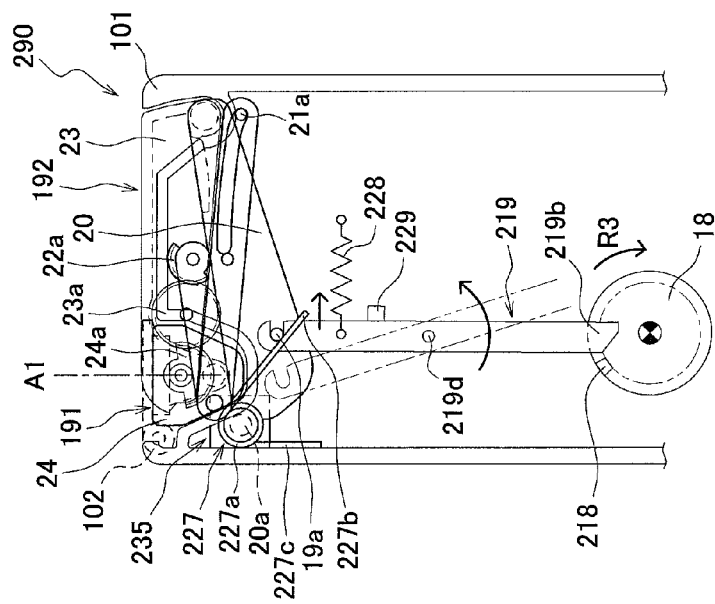
FIG. 15B is a side view of the flash device 290 in its pop-up state.

The basic constitution of the flash device 290 pertaining to the third embodiment is the same as that of the flash device 190, but the difference from the above embodiments is that when unlocked, the flash device 290 automatically pops up under the force of a spring. More specifically, as shown in FIGS. 15A and 15B, the flash device 290 has a torsion coil spring 227, a locking lever 219, a locking spring 228, and a damper mechanism 235.

The torsion coil spring 227 imparts rotational force to the first drive levers 20. The torsion coil spring 227 has a main body 227a that generates rotational force, a first end 227b, and a second end 227c. The main body 227a is fitted over the rotary shaft 20a. The first end 227b is hooked onto the pin 19a. The second end 227c hits the housing 101. The rotational force of the torsion coil spring 227 causes the coupling lever 19 to rotate so as to flip out and upward.

The locking lever 219 is provided in order to lock and unlock the first drive levers 20, and is supported by the housing 101 rotatably around a support pin 219d. As shown in FIGS. 15A and 15B, the locking lever 219 is pulled so as to rotate by the locking spring 228. The locking lever 219 is pressed by the elastic force of the locking spring 228 against a stopper 229 provided to the housing 101. Therefore, the locking lever 219 is usually stopped at the position shown in FIG. 15A.

The locking lever 219 has a first end 219a and a second end 219b. A locking groove 219c is formed in the first end 219a. The pin 19a can be inserted into the locking groove 219c. The direction in which the locking spring 228 pulls the locking lever 219 is the direction in which the pin 19a is fitted into the locking groove 219c. The second end 219b is disposed to be able to come into contact with a protrusion 218 of the bevel gear 18. When the bevel gear 18 rotates in the R3 direction, the protrusion 218 comes into contact with the second end 219b. As a result, the locking lever 219 rotates around a support pin 219d, and the pin 19a comes out of the locking groove 219c.

Figure 16:
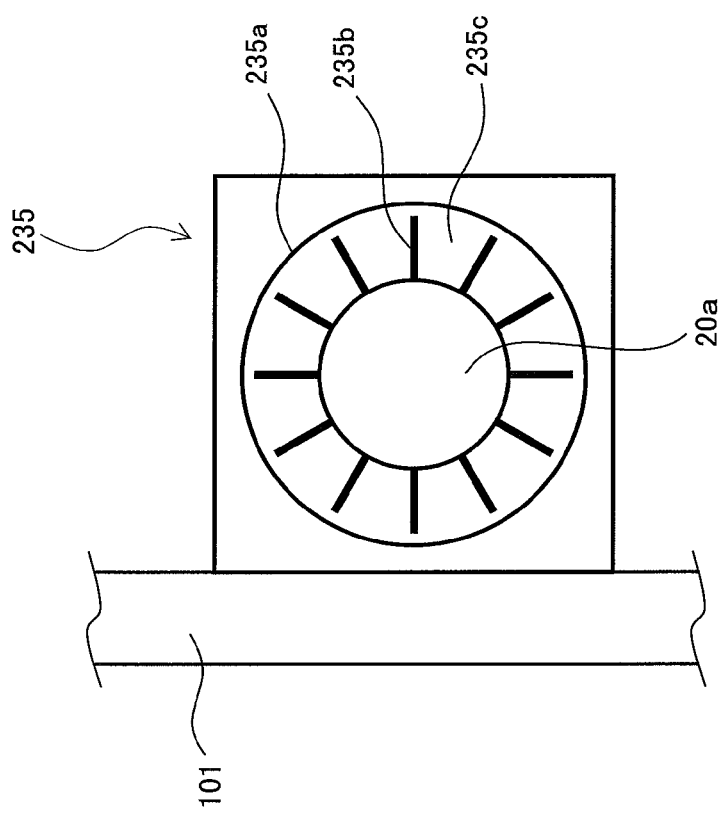
FIG. 16 is a simplified cross section of a damper mechanism 235.

As shown in FIG. 16, the damper mechanism 235 is provided in order to impart rotational resistance to the first drive levers 20, and has an outer tube 235a and a plurality of vanes 235b. The outer tube 235a is a cylindrical member with a larger inside diameter than the rotary shaft 20a. The vanes 235b are fixed to the rotary shaft 20a. The vane 235b and the rotary shaft 20a is held inside the outer tube 235a. A space 235c formed between the rotary shaft 20a and the outer tube 235a is sealed off by a sealing member (not shown). The space 235c is filled with resistant material such as oil. When the rotary shaft 20a rotates, the vanes 235b rotate within the space 235c filled with the oil. The viscous resistance of the oil imparts a certain amount of rotational resistance to the rotary shaft 20a. This somewhat slows the speed at which the flash device 290 pops up.

Figure 17:
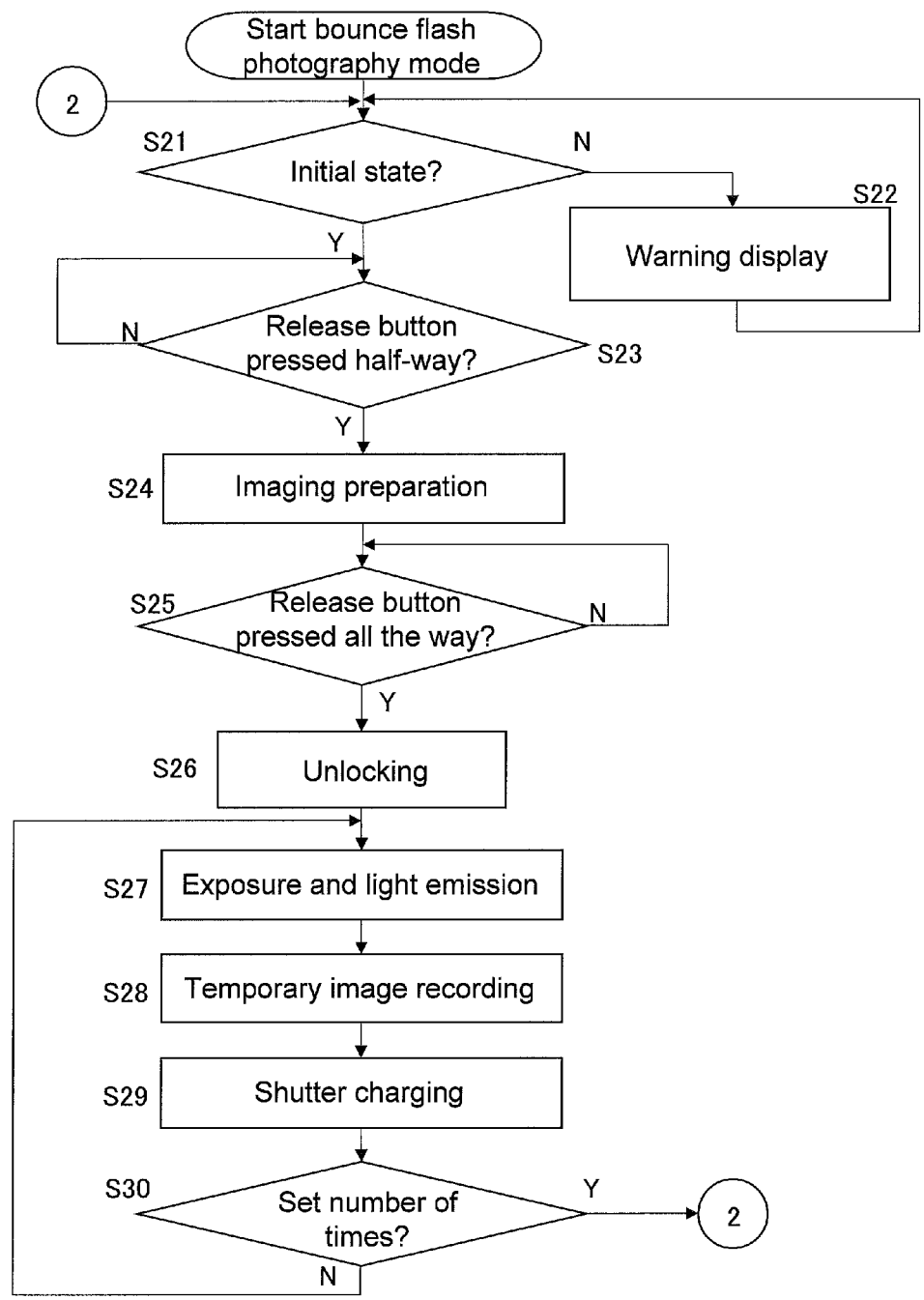
FIG. 17 is a flowchart of bounce flash photography mode (third embodiment).

When the flash device 290 described above is used, the flowchart of the bounce flash photography mode is as shown in FIG. 17. The flowchart in FIG. 17 will now be described.

As shown in FIG. 17, in bounce flash photography mode, the body controller 113 confirms whether or not the state of the flash device 290 is the initial state (S21). More specifically, a position detecting sensor (not shown) detects whether or not the first drive levers 20 are disposed at the position shown in FIG. 15A. The above-mentioned angle sensor 194 may be used for this position detecting sensor. The body controller 113 can ascertain whether or not the state of the flash device 290 is the initial state shown in FIG. 15A on the basis of the detection result of the position detecting sensor.

If the flash device 290 is in its initial state, the processing moves to step S23. If the flash device 290 is not in its initial state, the flash device 290 must be put in the initial state shown in FIG. 15A, so a warning notice to this effect is displayed on a display (not shown) (S22). If the user presses in the light emitter 191 of the flash device 290, the pin 19a of the first drive levers 20 fits into the locking groove 219c of the locking lever 219, and the flash device 290 enters the initial state shown in FIG. 15A.

If the flash device 290 is in the initial state shown in FIG. 15A, the state of the release button 30 is monitored by the body controller 113 (S23). When the release button 30 is pressed half-way down, auto-focusing or other such imaging preparation is performed (S24). If the release button 30 is pressed all the way down, the flash device 290 is unlocked prior to sequential imaging (S25, S26). More specifically, the drive gear 11a is driven in the R2 direction by the drive motor 11, and the carrier 14 rotates in the R1 direction. As a result, the planetary gear 15 meshes with the gear 17, and the bevel gear 18 rotates in the R3 direction. When the bevel gear 18 rotates in the R3 direction, the protrusion 218 comes into contact with the second end 219b of the locking lever 219. As rotation of the bevel gear 18 proceeds, the second end 219b is pushed by the protrusion 218, and the locking lever 219 rotates around the support pin 219d. When the locking lever 219 rotates, the pin 19a is removed from the locking groove 219c, and the locking of the first drive levers 20 by the locking lever 219 is released.

When the flash device 290 is unlocked, the first drive levers 20 are pushed upward by the torsion coil spring 227, and the flash device 290 begins to pop up. Since rotational resistance is imparted to the rotary shaft 20a at this point by the damper mechanism 235, the flash device 290 pops up somewhat more slowly than if there were no damper mechanism 235. Therefore, several images can be captured sequentially while the flash device 290 is popping up from the initial state shown in FIG. 15A to the popped up state shown in FIG. 15B.

More specifically, after unlocking, the shutter unit 140 operates at the shutter speed that has been set (or found by computation), and exposure of the image sensor 110 is performed (S27). Simultaneously with exposure, flash light is emitted from the flash device 290 (S27). More specifically, a light emission signal synchronized with the charge accumulation start signal of the image sensor controller 114 is sent from the body controller 113 to the flash circuit 199. The flash circuit 199 causes the xenon tube 26 of the flash device 290 to emit light on the basis of this light emission signal. Since the flash device 290 at this point is in a state midway between the initial state shown in FIG. 15A and the popped up state shown in FIG. 15B, flash light is emitted upward at an angle from the light emitter 191, for example. Indoors, this flash light is reflected off the ceiling, and the reflected light illuminates the subject as indirect light.

After exposure and light emission, the charge stored in the image sensor 110 is read by the image sensor controller 114 and outputted as an image signal. After image processing by the image processor 115, the outputted image data is recorded to the image recorder 48 (S28).

After the recording of the image data, shutter charging is performed (S29). More specifically, a shutter charging control signal is sent from the body controller 113 to the motor controller 141. The motor controller 141 produces a drive pulse for the drive motor 11 on the basis of this control signal, and the drive gear 11a is driven by the drive motor 11 in the R2 direction by a rotational angle corresponding to this drive pulse. The amount by which the drive gear 11a is driven here is calculated from the rotational angle of the cam gear 16 required for charging, and is preset by the body controller 113. Consequently, the spring used by the shutter unit 140 is charged via the cam gear 16.

Upon completion of shutter charging, the body controller 113 confirms whether or not the number of exposures has reached the set number (S30). When the image sensor 110 has the electric shutter function, or when the image sensor 110 is capable of performing thin-out read mode or pixel addition read mode, which are used in the moving picture photography, the step S8 may be skipped. This allows the processing speed of the entire sequence to be higher. This set number indicates the number of sequential images to be captured, and is preset to the body controller 113. If the number of sequential captures has not reached the set number, steps S27 to S30 are repeated. Once the number of sequential captures reaches the set number, the bounce flash photography mode is ended.

As described above, sequential imaging while the bounce angle is varied is also possible with a constitution in which the flash device 290 is popped up by the torsion coil spring 227.

As long as enough time for pop-up can be ensured, the flash device 290 can be popped up in some other manner. For instance, the torsion coil spring 227 may be some other member so long as it imparts elastic force to the first drive levers 20. Also, the damper mechanism 235 may be an escape wheel, for example.

Also, in the third embodiment above, a drive unit 193 was used to unlock the flash device 290, but an unlocking button may instead be provided for mechanically unlocking the device. More specifically, the constitution may be such that when the unlocking button is pressed, the locking lever 219 is mechanically driven. In this case, the unlocking button preferably is given the same function as the release button 30. If the unlocking button is given the same function as the release button 30, then when the unlocking button is pressed, the flash device 290 will be unlocked and the sequential capture of images will be started. This allows the constitution of the third embodiment to be made simpler.

OTHER EMBODIMENTS

The specific constitution of the present invention is not limited to or by the embodiments given above, and various changes and modifications can be made without departing from the gist of the invention.

(A) In the above embodiments, the interchangeable lens type of digital camera 1 or the camera body 100 was given as an example of an imaging device, but it may instead be a digital video camera or digital camera with an integrated type of interchangeable lens. The digital camera 1 may be a device with which a plurality of sets of image data can be acquired continuously, and may be a device capable of still and/or moving picture imaging.

(B) The bounce angle θ need not be different for all of the image data acquired in a single sequential capture. In other words, the image data acquired for every different bounce angle θ are not limited to being a single image. For example, The bounce angles θ for the first to third images may all be different from each other, while that of the fourth image has the same bounce angle θ as the third image. Thus, the method for acquiring a plurality of sets of image data sequentially captured at different bounce angles θ is not limited to the method in the embodiments.

(C) The light emission by the flash device 190 need not be full emission, and may instead been intermittent emission using an IGBT (Insulated Gate Bipolar Transistor) element, for example. Since the emission of light from the flash device 190 is carried out in an extremely short period of time, rather the bounce drive mechanism being stopped according to the frame rate, if the drive speed of the drive motor 11 is controlled by the motor controller 141 and the body controller 113 using signals outputted from the angle sensor 194, light may be emitted from the light emitter 191 while moving the flash device 190 in synchronization with the frame rate.

(D) The amount of light emission and exposure may be controlled and the white balance adjusted, rather than just the bounce angle. Another constitution that is possible involves issuing a warning about shading attributable to a hood or other such optional member.

(E) In the above embodiments, since the flash device 190 is electrically operated, there is no need for the user to force an operation for flash photography, and when there is no need to use the flash device 190, such as when the power is off or when the flash photography prohibited mode has been selected, the flash device 190 can be automatically lowered and stowed in the housing 101. Therefore, it is less likely that the popped up flash device 190 will be damaged.

However, because it is electrical, the flash device 190 cannot be driven if power supply is cut off. If this happens, since a charge has been stored in the capacitor used for light emission, it is possible to control pop-down operation by utilizing the charge stored in the capacitor.

(F) It is also possible to increase the amount of pop-up a little more from the state shown in FIG. 9B. In this case, since the light emitter 191 faces downward at an angle, the bounce angle is negative. Therefore, in close-up photography, it will be possible for the flash light illumination direction to be slightly ahead, and shading by parallax can also be eliminated. In this case, it is necessary to detection the absolute distance by means of a range finding function of the camera body 100, detection of the position of the focus lens of the interchangeable lens unit 200, or the like.

(G) The constitution of the angle sensor 194 is not limited to that in the above embodiments. Also, the state of the flash device 190 by the body controller 113 may be ascertained in some other manner.

What is claimed is:

1. An imaging device for acquiring image data about a subject, comprising:
    an image acquisition section configured to acquire continuously a plurality of image data from an optical image of the subject;
    a housing arranged to hold the image acquisition section;
    a shutter unit configured to adjust the amount of exposure light of the image acquisition section;
    a flash device configured to emit a flash of light, and configured to vary the emission angle of the flash light with respect to the housing, the flash device including a light emitter configured to emit a flash of light, an angle changing unit supporting the light emitter to be rotatable with respect to the housing, and a drive unit configured to drive the angle changing unit to rotate the light emitter with respect to the housing; and
    a flash controller configured to control the drive unit of the flash device so that the emission angle of the flash light when the plurality of image data are being continuously acquired differs for at least two image data out of the plurality of image data,
    wherein the drive unit is used in charging the shutter unit with drive force.

2. The imaging device according to claim 1, wherein the flash controller links the operation of the flash device to the operation of the image acquisition section when the plurality of image data are being continuously acquired.

3. The imaging device according to claim 2, further comprising
    a memory section with which the plurality of image data acquired by the image acquisition section are stored in association with the emission angle when the image data was acquired.

4. The imaging device according to claim 3, wherein the flash device has an angle detector configured to detect the emission angle, and the flash controller configured to control the flash device on the basis of the detection result from the angle detector.

5. The imaging device according to claim 4, further comprising
a display unit configured to display at least two image data out of the plurality of image data side by side.

6. The imaging device according to claim 2, wherein
the flash device has an angle detector configured to detect the emission angle, and
the flash controller configured to control the flash device on the basis of the detection result from the angle detector.

7. The imaging device according to claim 2, further comprising
a display unit configured to display at least two image data out of the plurality of image data side by side.

8. The imaging device according to claim 1, further comprising
a memory section with which the plurality of image data acquired by the image acquisition section are stored in association with the emission angle when the image data was acquired.

9. The imaging device according to claim 1, wherein
the flash device has an angle detector configured to detect the emission angle, and
the flash controller configured to control the flash device on the basis of the detection result from the angle detector.

10. The imaging device according to claim 1, further comprising
a display unit configured to display at least two image data out of the plurality of image data side by side.

11. The imaging device according to claim 1, wherein
the angle changing unit is configured to change the position and orientation of the light emitter with respect to the housing so that the emission angle with respect to the housing becomes smaller the farther the light emitter is away from the housing.

12. The imaging device according to claim 1, wherein
the volume of the plurality of image data continuously acquired by the image acquisition section is smaller than the volume if image data is not continuously acquired.

13. The imaging device according to claim 1, wherein
a rotation axis of the light emitter is substantially parallel to a longitudinal direction of the housing.

14. The imaging device according to claim 1, wherein
the flash device includes only the light emitter as an element configured to emit the flash of light.

15. An imaging device for acquiring image data about a subject, comprising:
an image acquisition section configured to acquire continuously a plurality of image data from an optical image of the subject;
a housing arranged to hold the image acquisition section;
a flash device configured to emit a flash of light, and configured to vary the emission angle of the flash light with respect to the housing, the flash device including a light emitter configured to emit a flash of light, an angle changing unit supporting the light emitter to be rotatable with respect to the housing, and a drive unit configured to drive the angle changing unit to rotate the light emitter with respect to the housing;
a flash controller configured to control the drive unit of the flash device so that the emission angle of the flash light when the plurality of image data are being continuously acquired differs for at least two image data out of the plurality of image data;
a display unit configured to display at least two image data out of the plurality of image data side by side; and
a control interface configured to handle the operation of selecting as selected image data at least one piece of image data from among the at least two image data displayed on the display unit, wherein
the flash controller configured to set the emission angle of the flash device to the emission angle corresponding to the selected image data.

16. An imaging device for acquiring image data about a subject, comprising:
an image acquisition section configured to acquire continuously a plurality of image data from an optical image of the subject;
a housing arranged to hold the image acquisition section;
a flash device configured to emit a flash of light, and configured to vary the emission angle of the flash light with respect to the housing, the flash device including a light emitter configured to emit a flash of light, an angle changing unit supporting the light emitter to be rotatable with respect to the housing, and a drive unit configured to drive the angle changing unit to rotate the light emitter with respect to the housing; and
a flash controller configured to control the drive unit of the flash device so that the emission angle of the flash light when the plurality of image data are being continuously acquired differs for at least two image data out of the plurality of image data, wherein
the angle changing unit is configured to change the position and orientation of the light emitter with respect to the housing so that the emission angle with respect to the housing becomes smaller the farther the light emitter is away from the housing.

17. An imaging device for acquiring image data about a subject, comprising:
an image acquisition section configured to acquire continuously a plurality of image data from an optical image of the subject;
a housing arranged to hold the image acquisition section;
a flash device configured to emit a flash of light, and configured to vary the emission angle of the flash light with respect to the housing, the flash device including a light emitter configured to emit a flash of light, an angle changing unit supporting the light emitter to be rotatable with respect to the housing, and a drive unit configured to drive the angle changing unit to rotate the light emitter with respect to the housing;
a flash controller configured to control the drive unit of the flash device so that the emission angle of the flash light when the plurality of image data are being continuously acquired differs for at least two image data out of the plurality of image data;
a memory section with which the plurality of image data acquired by the image acquisition section are stored in association with the emission angle when the image data was acquired;
a display unit configured to display at least two image data out of the plurality of image data side by side; and
a control interface configured to handle the operation of selecting as selected image data at least one piece of image data from among the at least two image data displayed on the display unit, wherein
the flash device has an angle detector configured to detect the emission angle,
the flash controller configured to control the flash device on the basis of the detection result from the angle detector, the flash controller links the operation of the flash device to the operation of the image acquisition section when the plurality of image data are being continuously acquired, and the flash controller configured to set the emission angle of the flash device to the emission angle corresponding to the selected image data.

18. The imaging device according to claim 17, further comprising
a shutter unit configured to adjust the amount of exposure light of the image acquisition section, wherein
the drive unit is used in charging the shutter unit with drive force.

19. The imaging device according to claim 18, wherein
the angle changing unit is configured to change the position and orientation of the light emitter with respect to the housing so that the emission angle with respect to the housing becomes smaller the farther the light emitter is away from the housing.

20. The imaging device according to claim 17, wherein
the angle changing unit is configured to change the position and orientation of the light emitter with respect to the housing so that the emission angle with respect to the housing becomes smaller the farther the light emitter is away from the housing.

21. The imaging device according to claim 20, wherein
the volume of the plurality of image data continuously acquired by the image acquisition section is smaller than the volume if image data is not continuously acquired.

* * * * *